(12) United States Patent
Widdowson et al.

(10) Patent No.: US 7,559,661 B2
(45) Date of Patent: Jul. 14, 2009

(54) IMAGE ANALYSIS FOR GENERATION OF IMAGE DATA SUBSETS

(75) Inventors: Simon Widdowson, Palo Alto, CA (US); Niranjan Damera-Venkata, Palo Alto, CA (US); Nelson Liang An Chang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 478 days.

(21) Appl. No.: 11/297,922

(22) Filed: Dec. 9, 2005

(65) Prior Publication Data

US 2007/0132966 A1 Jun. 14, 2007

(51) Int. Cl.
G03B 21/00 (2006.01)
G03B 21/14 (2006.01)

(52) U.S. Cl. .......................................... 353/121; 353/94

(58) Field of Classification Search .................. 355/85, 355/94, 121; 345/204, 694; 348/798–803; 382/276; 349/8, 73, 77
See application file for complete search history.

(56) References Cited

U.S. PATENT DOCUMENTS

| | | | |
|---|---|---|---|
| 4,373,784 A | 2/1983 | Nonomura et al. |
| 4,662,746 A | 5/1987 | Hornbeck |
| 4,811,003 A | 3/1989 | Strathman et al. |
| 4,956,619 A | 9/1990 | Hornbeck |
| 5,061,049 A | 10/1991 | Hornbeck |
| 5,083,857 A | 1/1992 | Hornbeck |
| 5,146,356 A | 9/1992 | Carlson |
| 5,309,241 A | 5/1994 | Hoagland |
| 5,317,409 A | 5/1994 | Macocs |
| 5,386,253 A | 1/1995 | Fielding |
| 5,402,184 A | 3/1995 | O'Grady et al. |
| 5,490,009 A | 2/1996 | Venkateswar et al. |
| 5,557,353 A | 9/1996 | Stahl |
| 5,689,283 A | 11/1997 | Shirochi |
| 5,751,379 A | 5/1998 | Markandey et al. |
| 5,842,762 A | 12/1998 | Clarke |
| 5,897,191 A | 4/1999 | Clarke |
| 5,912,773 A | 6/1999 | Barnett et al. |
| 5,920,365 A | 7/1999 | Eriksson |
| 5,953,148 A | 9/1999 | Moseley et al. |
| 5,978,518 A | 11/1999 | Oliyide et al. |

(Continued)

FOREIGN PATENT DOCUMENTS

EP 1 001 306 A2 5/2000

OTHER PUBLICATIONS

C. Jaynes et al., "Super-Resolution Composition in Multi-Projector Display's," IEEE Int'l Workshop on Projector-Camera Systems, Oct. 2003; 8 pgs.

(Continued)

*Primary Examiner*—Hung Henry Nguyen

(57) ABSTRACT

A method comprising analyzing a portion of image data to identify a characteristic of the portion of the image data and determining an algorithm based on the characteristic is provided. The algorithm is configured to generate at least first and second image data subsets with distortion using the image data such that the first and the second image data subsets are configured to cause an image corresponding to the image data to be reproduced without the distortion in response to being simultaneously displayed with first and second projection devices, respectively.

20 Claims, 8 Drawing Sheets

U.S. PATENT DOCUMENTS

| | | | |
|---|---|---|---|
| 6,025,951 | A | 2/2000 | Swart et al. |
| 6,067,143 | A | 5/2000 | Tomita |
| 6,104,375 | A | 8/2000 | Lam |
| 6,118,584 | A | 9/2000 | Van Berkel et al. |
| 6,141,039 | A | 10/2000 | Poetsch |
| 6,184,969 | B1 | 2/2001 | Fergason |
| 6,219,017 | B1 | 4/2001 | Shimada et al. |
| 6,239,783 | B1 | 5/2001 | Hill et al. |
| 6,243,055 | B1 | 6/2001 | Fergason |
| 6,313,888 | B1 | 11/2001 | Tabata |
| 6,317,171 | B1 | 11/2001 | Dewald |
| 6,384,816 | B1 | 5/2002 | Tabata |
| 6,390,050 | B2 | 5/2002 | Feikus |
| 6,393,145 | B2 | 5/2002 | Betrisey et al. |
| 6,522,356 | B1 | 2/2003 | Watanabe |
| 6,657,603 | B1 | 12/2003 | Demetrescu et al. |
| 7,317,465 | B2 * | 1/2008 | Allen et al. ............ 345/694 |
| 7,355,612 | B2 * | 4/2008 | Damera-Venkata et al. . 345/694 |
| 7,387,392 | B2 * | 6/2008 | Widdowson et al. ......... 353/94 |
| 7,407,295 | B2 * | 8/2008 | Damera-Venkata et al. ... 353/94 |
| 2003/0020809 | A1 | 1/2003 | Gibbon et al. |
| 2003/0076325 | A1 | 4/2003 | Thrasher |
| 2003/0090597 | A1 | 5/2003 | Katoh et al. |
| 2004/0239885 | A1 | 12/2004 | Jaynes et al. |

OTHER PUBLICATIONS

L.M. Chen & S. Hasagawa, "Visual Resolution Limits for Color Matrix Displays—One Panel Projectors", vol. 13, pp. 221-226, 1992.

A. Yasuda et al., "FLC Wobbling for High-Resolution Projectors", Journal of the SID, May 1997, pp. 229-305.

T. Tokita et al., "P-108: FLC Resolution-Enhancing Device for Projection Displays", SID 02 Digest 2002, pp. 638-641.

D.K. Kelley, "Motion and Vision—II. Stabilized Spatio-Temporal Threshold Surface", Journal of the Optical Society of America, Vo. 69, No. 10, Oct. 1979.

Candice H. Brown Elliott et al., "Color Subpixel Rendering Projectors and Flat Panel Displays"; SMPTE Advanced Motion Imaging Conference; Feb. 27-Mar. 1, 2003; pp. 1-4.

Diana C. Chen, "Display Resolution Enhancement with Optical Scanners", Applied Optics, Vo. 40, No. 5, Feb. 10, 2001; pp. 636-643.

* cited by examiner

IMAGE ANALYSIS FOR GENERATION OF IMAGE DATA SUBSETS

CROSS-REFERENCE TO RELATED APPLICATION

This application is related to U.S. patent application Ser. No. 11/080,583, filed Mar. 15, 2005, and entitled PROJECTION OF OVERLAPPING SUB-FRAMES ONTO A SURFACE; U.S. patent application Ser. No. 11/080,223, filed Mar. 15, 2005, and entitled PROJECTION OF OVERLAPPING SINGLE-COLOR SUB-FRAMES ONTO A SURFACE; U.S. patent application Ser. No. 11/298,233, filed concurrently herewith, and entitled PROJECTION OF OVERLAPPING SUB-FRAMES ONTO A SURFACE; U.S. patent application Ser. No. 11/298,232, filed concurrently herewith, and entitled GENERATION OF IMAGE DATA SUBSETS; and U.S. patent application Ser. No. 11/298,190, filed concurrently herewith, and entitled GENERATION OF IMAGE DATA SUBSETS. These applications are incorporated by reference herein.

BACKGROUND

Two types of projection display systems are digital light processor (DLP) systems, and liquid crystal display (LCD) systems. It is desirable in some projection applications to provide a high lumen level output, but it is very costly to provide such output levels in existing DLP and LCD projection systems. Three choices exist for applications where high lumen levels are desired: (1) high-output projectors; (2) tiled, low-output projectors; and (3) superimposed, low-output projectors.

When information requirements are modest, a single high-output projector is typically employed. This approach dominates digital cinema today, and the images typically have a nice appearance. High-output projectors have the lowest lumen value (i.e., lumens per dollar). The lumen value of high output projectors is less than half of that found in low-end projectors. If the high output projector fails, the screen goes black. Also, parts and service are available for high output projectors only via a specialized niche market.

Tiled projection can deliver very high resolution, but it is difficult to hide the seams separating tiles, and output is often reduced to produce uniform tiles. Tiled projection can deliver the most pixels of information. For applications where large pixel counts are desired, such as command and control, tiled projection is a common choice. Registration, color, and brightness must be carefully controlled in tiled projection. Matching color and brightness is accomplished by attenuating output, which costs lumens. If a single projector fails in a tiled projection system, the composite image is ruined.

Superimposed projection provides excellent fault tolerance and full brightness utilization, but resolution is typically compromised. Algorithms that seek to enhance resolution by offsetting multiple projection elements have been previously proposed. These methods assume simple shift offsets between projectors, use frequency domain analyses, and rely on heuristic methods to compute component sub-frames. The proposed systems do not generate optimal sub-frames in real-time, and do not take into account arbitrary relative geometric distortion between the component projectors, and do not project single-color sub-frames.

In addition, the previously proposed systems may not implement security features to prevent the unauthorized reproduction of images displayed with such systems. For example, the proposed systems may not provide sufficient security to prevent images from being "tapped off", i.e., copied from, the systems. In addition, images tapped off from a system may be reproduced without substantial distortion by another system.

Existing projection systems do not provide a cost effective solution for secure, high lumen level (e.g., greater than about 10,000 lumens) applications.

SUMMARY

One form of the present invention provides a method comprising analyzing a portion of image data to identify at least one characteristic of the portion of the image data and determining an algorithm based on the characteristic. The algorithm is configured to generate at least first and second image data subsets with distortion using the image data such that the first and the second image data subsets are configured to cause an image corresponding to the image data to be reproduced without the distortion in response to being simultaneously displayed with first and second projection devices, respectively.

DETAILED DESCRIPTION

Figure 1:
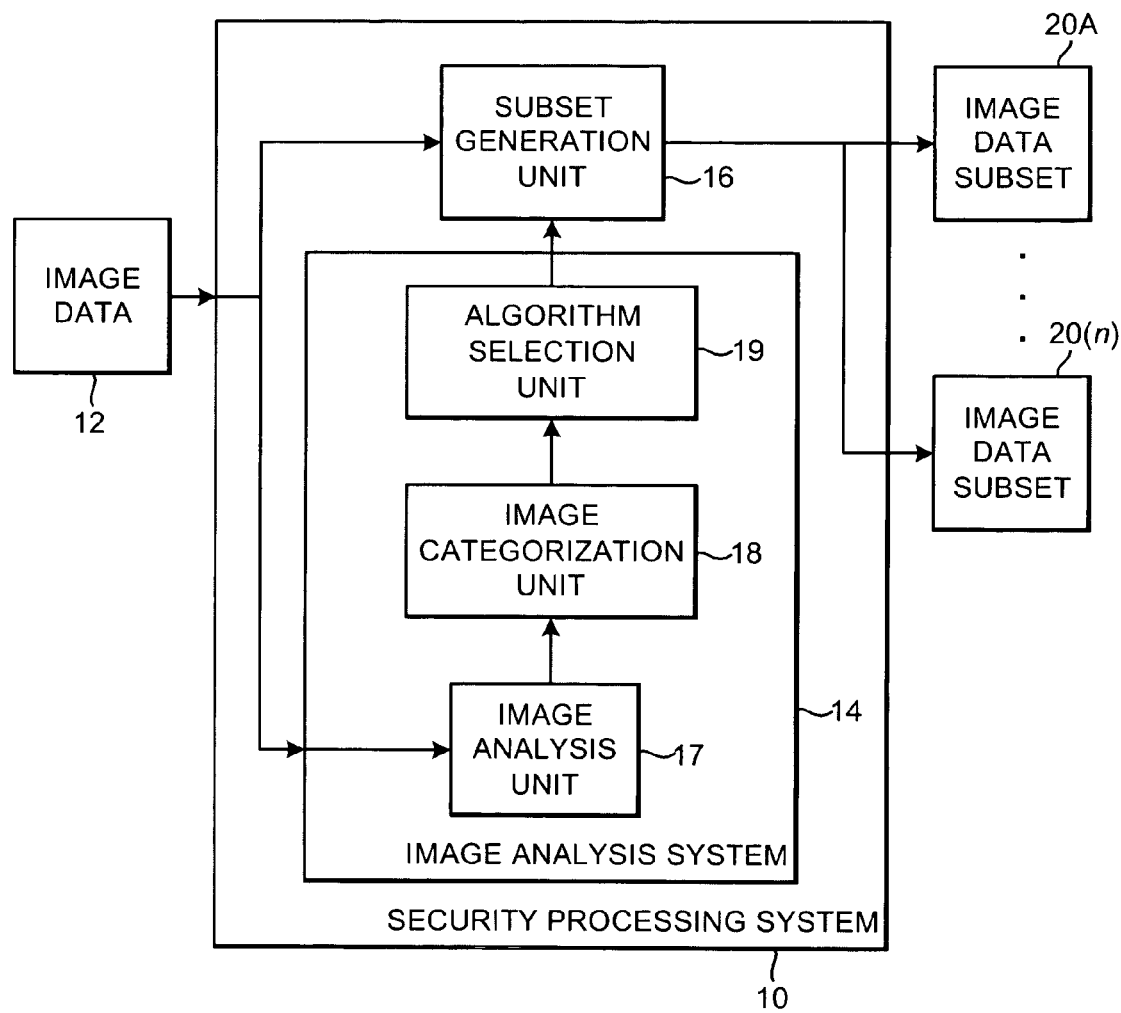
FIG. 1 is a block diagram illustrating a security processing system according to one embodiment of the present invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

According to embodiments described herein, systems and methods for generating and displaying image data subsets are provided. The subsets are generated from a set of image data, such as a set of still or video image frames, such that each subset alone includes insufficient information to provide a high quality reproduction of the images of the image data. To do so, each subset is generated such that it includes distortion that causes an image displayed using the subset to be visibly degraded. The distortion may occur because of missing information in a subset (e.g., a subset that does not include one or more color planes), may be added to each subset, or may result from mathematically transforming the values of image data (e.g., by splitting values of the image data into multiple subsets). The distortion is included in the subsets such that the distortion cancels in images displayed using all of the subsets to provide a high quality reproduction.

In generating the subsets, different algorithms may cause different levels of distortion to be included in a subset depending on the type of image content in the image data. With an increased level of distortion in a subset, the visible degradation of the images in the subset and the difficulty of removing the distortion from a subset increases. Accordingly, systems and methods are described herein for analyzing image data to determine one or more algorithms to use in generating image data subsets to maximize the distortion and visible degradation in the individual subsets and minimize visible degradation in the combined image.

To provide a high quality reproduction of the images of the image data, an image display system generates sub-frames using each of the image data subsets and simultaneously displays the sub-frames in positions that at least partially overlap. In one embodiment described in additional detail with reference to FIGS. 3 and 4A, the image display system generates all of the sub-frames using all of the image data subsets. In another embodiment, described in additional detail with reference to FIGS. 3 and 4B, the image display system generates a set of sub-frames for each image data subset. In both embodiments, the image display system generates the sub-frames such that individual sub-frames by themselves do not provide a high quality reproduction of the images of the image data when displayed. In addition, the image display system generates the sub-frames according to a relationship of two or more projection devices that are configured to display the sub-frames. The image display system simultaneously displays the sub-frames in at least partially overlapping positions using two or more projection devices such that the simultaneous display of the sub-frames provide a high quality reproduction of the images of the image data.

The use of the systems and methods described herein may provide security features for image data. For example, any image data that is tapped off, i.e., copied, from fewer than all of the projection devices includes insufficient information to provide a high quality reproduction of the images of the image data. In addition, because the image data system generates the sub-frames according to the relationship of the projection devices, the sub-frames are configured such that they do not provide a high quality reproduction of the images of the image data when used in an image data system with a different relationship or when additional image processing is performed on the sub-frames to attempt to combine the sub-frames in software.

FIG. 1 is a block diagram illustrating a security processing system 10. Security processing system 10 is configured to process image data 12 to generate two or more image data subsets 20A through 20(n) (referred to individually as image data subset 20 or collectively as image data subsets 20), where n is greater than or equal to one and represents the nth encrypted image data subset.

Image data 12 includes a set of still or video image frames stored in any suitable medium (not shown) that is accessible by security processing system 10. Image data 12 can also be comprised of one or more component frames. One example is a stereo image pair, where the left and right views correspond to different component frames. Security processing system 10 accesses image data 12 and generates image data subsets 20.

Security processing system 10 generates image data subsets 20 such that image data subsets 20 combine to cause the images of image data 12 to be reproduced in response to being simultaneously displayed with a set of projection devices. Security processing system 10 includes an image analysis system 14 and a subset generation unit 16. Image analysis system 14 analyzes and categorizes image data 12 and determines one or more algorithms for generating subsets 20. Subset generation unit 16 generates image data subsets 20 from image data 12 using the one or more algorithms determined by image analysis system 14. The algorithms cause image data subsets 20 to be generated with distortion relative to the images of image data 12. The distortion may occur because of missing information in an image data subset 20 (e.g., a subset that does not include one or more color planes), may be added to each image data subset 20 in the form of noise, or may result from mathematically transforming the values of image data 12 in each image data subset 20 (e.g., by splitting values of image data 12 into multiple image data subsets 20). Subset generation unit 16 may create distortion on a per pixel, per segment, per frame, per color plane, or any combination of pixels, segments, frames, and color planes of image data 12 in accordance with the one or more algorithms to generate the values of image data subsets 20.

Security processing system 10 generates each image data subset 20 such that the distortion causes an image displayed using less than all of image data subsets 20 to be visibly degraded. Security processing system 10 also generates each image data subset 20 such that the distortion cancels, i.e., is not visible, in images displayed using all of image data subsets 20 to provide a high quality reproduction of images from image data 12. Security processing system 10 generates image data subsets 20 such that image data subsets 20 are configured to cause images corresponding to image data 12 to be reproduced without the distortion in response to being simultaneously displayed with a set of projection devices in at least partially overlapping positions.

By using the distortion, security processing system 10 generates image data subsets 20 such that each image data subset 20 includes insufficient information to provide a high quality reproduction of the images of image data 12. Each image data subset 20 forms a set of distorted images. Accordingly, an attempt to reproduce the images in image data 12 using less than all of image data subsets 20 provides only a low quality reproduction of the images of image data 12. The low quality reproduction results from the limited range of information caused by generating each image data subset 20 using the distortion.

Figure 2:
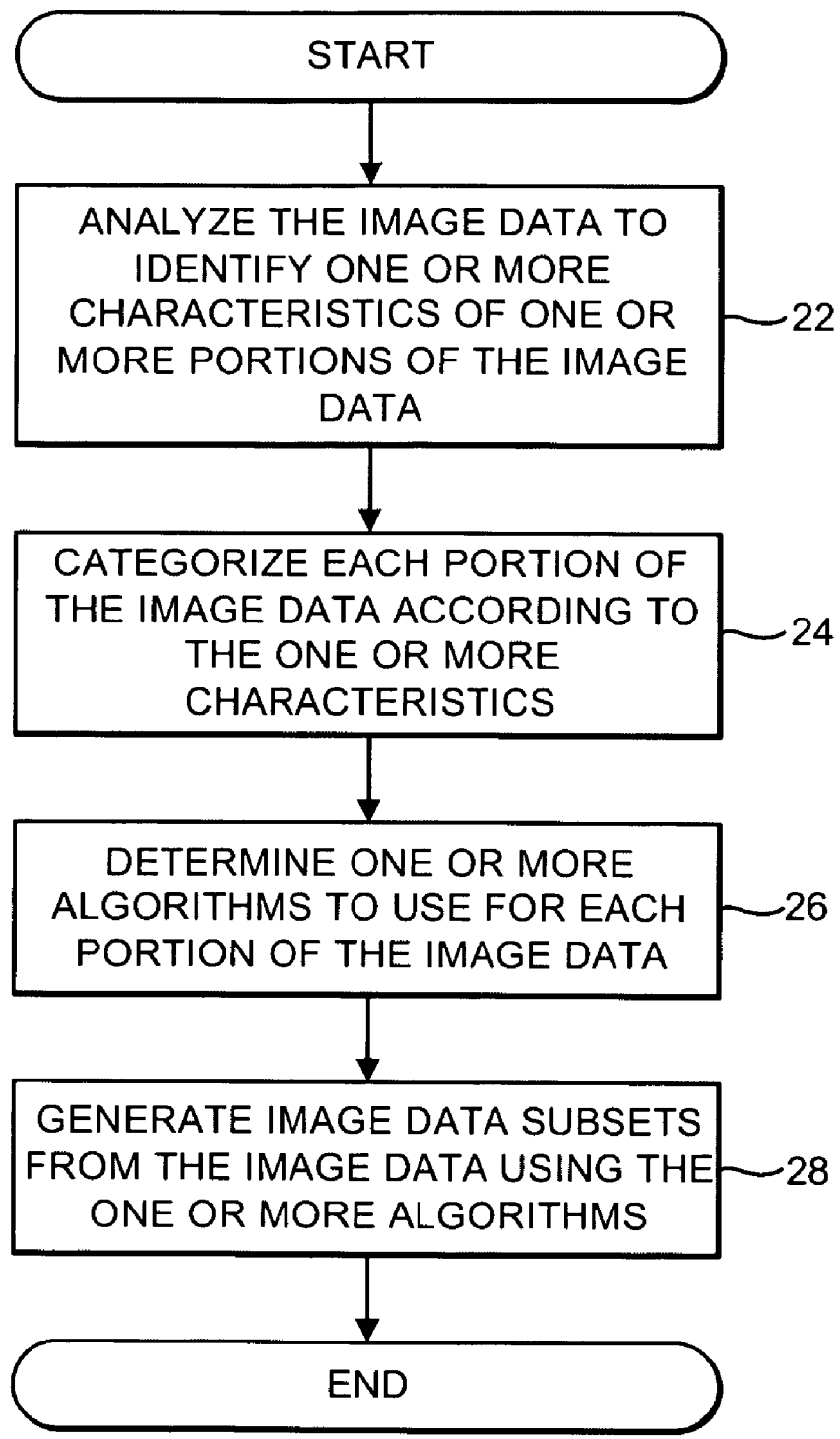
FIG. 2 is a flow chart illustrating a method for generating image data subsets according to one embodiment of the present invention.

As noted above, image analysis system 14 analyzes and categorizes image data 12 and determines one or more algorithms for generating subsets 20. Image analysis system 14 includes an image analysis unit 17, an image categorization unit 18, and an algorithm selection unit 19. The operation of image analysis system 14, including image analysis unit 17, image categorization unit 18, and algorithm selection unit 19 will now be described with reference to FIG. 2. FIG. 2 is a flow chart illustrating a method for generating image data subsets.

Referring to FIGS. 1 and 2, image analysis unit 17 receives image data 12 and analyzes image data 12 to identify one or more characteristics of image data 12 as indicated in a block 22. Image analysis unit 17 performs the analysis using any suitable image processing and analysis tools. Image analysis unit 17 performs each analysis on any suitable portion of image data 12. For example, image analysis unit 17 may analyze a single frame, a set of frames, or a segment in a frame for each analysis performed. Image analysis unit 17 may analyze each frame, each set of frames, or each segment in a frame using different image processing and analysis tools. The segments may be of equal size or sized according to the content of a frame. The identified characteristics may include a level of image detail, a measure of color contrast across an image, a measure of the number of faces in an image, or any other suitable characteristic of image data 12. Image analysis unit 17 provides the one or more characteristics of image data 12 to image categorization unit 18.

Image categorization unit 18 receives the one or more characteristics of image data 12 from image analysis unit 17 and categorizes each portion of image data 12 analyzed by image analysis unit 17 according to the one or more characteristics of each portion determined by image analysis unit 17 as indicated in a block 24. Image categorization unit 18 categorizes each portion into a general classification or specific classification depending on the attributes of the various encoding algorithms to be used by subset generation unit 16 to generate image data subsets 20. Image categorization unit 18 provides the categories to algorithm selection unit 19.

Algorithm selection unit 19 receives the categories from image categorization unit 18 and determines one or more algorithms to use for each portion of image data 12 analyzed by image analysis unit 17 as indicated in a block 26. The algorithms determined by algorithm selection unit 19 may include a bit-plane splitting algorithm, a color channel splitting algorithm, a random factor splitting algorithm, or any other suitable algorithm for generating image data subsets 20 with distortion. Algorithm selection unit 19 provides an identification of the one or more algorithms to use for each portion of image data 12 analyzed by image analysis unit 17 to subset generation unit 16.

Subset generation unit 16 receives image data 12 and the identification of the one or more algorithms for each portion of image data 12 from algorithm selection unit 19. Subset generation unit 16 generates image data subsets 20 from image data 12 using the one or more algorithms determined by algorithm selection unit 19 as indicated in a block 28. The algorithms cause image data subsets 20 to be generated with distortion. Subset generation unit 16 may apply noise on a per pixel, per segment, per frame, per color plane, or any combination of pixels, segments, frames, and color planes of image data 12 in accordance with the one or more algorithms to generate the values of image data subsets 20. The algorithms used by subset generation unit 16 to generate image data subsets 20 may include a bit-plane splitting algorithm, a color channel splitting algorithm, a random factor splitting algorithm, or any other suitable algorithm for generating image data subsets 20 with distortion.

With a bit-plane splitting algorithm, subset generation unit 16 generates image data subsets 20 from image data 12 such that each image data subset 20 includes a selected range of grayscale values for each image frame of image data 12. For example, subset generation unit 16 may generate a first image data subset 20 with grayscale values from 0 to 127, and subset generation unit 16 may generate a second image data subset 20 with grayscale values from 128 to 255. Other ranges and other numbers of ranges may be used in other embodiments.

With a color channel splitting algorithm, subset generation unit 16 generates image data subsets 20 from image data 12 such that each image data subset 20 includes selected color plane for each image frame of image data 12. For example, subset generation unit 16 may generate a first image data subset 20 for the red color plane, subset generation unit 16 may generate a second image data subset 20 for the green color plane, and subset generation unit 16 may generate a third image data subset 20 for the blue color plane. Other color planes or combination of color planes may be used in other embodiments.

With a random factor splitting algorithm, subset generation unit 16 generates image data subsets 20 from image data 12 using one or more random splitting factors according to any suitable algorithm. The random splitting factors cause each value in image data 12 to be divided between two or more image data subsets 20 in proportions determined by the random splitting factors. The random splitting factors may be generated using any suitable randomizing algorithm and any suitable scale of values, e.g., values between zero to one. The random splitting factors may also be generated using a random number generator (not shown) or using a known, systematically random factor.

The following example illustrates the operation of security processing system 10 in analyzing image data 12 to determine one or more algorithms to use in generating image data subsets 20. In this example, image data 12 includes a frame with a first segment and a second segment.

Image analysis unit 17 analyzes the first segment of image data 12 using an image processing tool that identifies the level of detail in the first segment and using image processing tool that measures the color contrast across the first segment. Image analysis unit 17 also analyzes the second segment of image data 12 using an image processing tool that identifies the level of detail in the second segment and using image processing tool that measures the color contrast across the second segment.

From the analyses of the first segment by image analysis unit 17, image categorization unit 18 determines that the first segment includes a low level of detail and a high level of saturated colors. Image categorization unit 18 also determines that the second segment includes a high level of detail and a low level of saturated colors from the analyses of the second segment by image analysis unit 17.

For the first segment, algorithm selection unit 19 determines that a color channel splitting algorithm is to be used to generate the portions of image data subsets 20 that correspond to the first segment. Algorithm selection unit 19 makes the determination because of the high level of saturated colors in the first segment and the low level of detail in the first segment. A color channel splitting algorithm may increase the overall distortion in the portions of image data subsets 20 that correspond to the first segment. In addition, applying high-frequency noise to the portions of image data subsets 20 that correspond to the first segment may be ineffective as a low-pass filter operation may be able to remove the high-frequency noise from the portions.

For the second segment, algorithm selection unit 19 determines that a random factor splitting algorithm is to be used to generate the portions of image data subsets 20 that correspond to the second segment. Algorithm selection unit 19 makes the determination because of the low level of saturated colors in the second segment and the high level of detail in the second segment. A random factor splitting algorithm may apply high-frequency noise to the portions of image data subsets 20 that correspond to the second segment. Because the second segment includes a high level of detail, a low-pass filter operation may be not able to remove the high-frequency noise from the portions without reducing the level of detail in the second segment.

Algorithm selection unit 19 provides an identification of the color channel splitting algorithm to use for the first segment of image data 12 and an identification of the random factor algorithm to use for the second segment of image data 12 to subset generation unit 16. The segmentation of the algorithms selections may be optionally represented in the form of a region-based array or mask. Subset generation unit 16 generates the portions of image data subsets 20 that correspond to the first segment of image data 12 using the color channel splitting algorithm, and subset generation unit 16 generates the portions of image data subsets 20 that correspond to the second segment of image data 12 using the random factor splitting algorithm By analyzing image data 12 to determine one or more algorithms to use in generating image data subsets 20, security processing system 10 may maximize the distortion and visible degradation in each image data subset 20 with minimal impact on the visual quality of the final displayed image.

Figure 3:
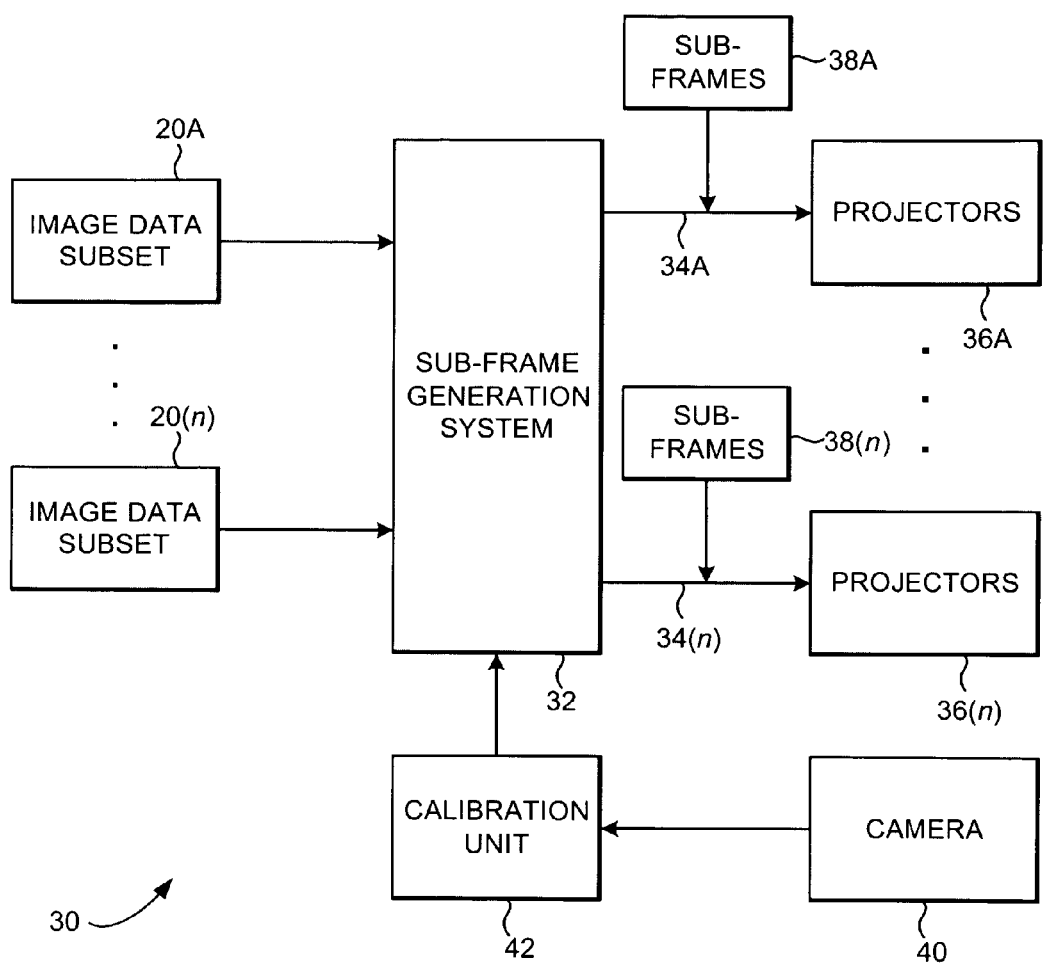
FIG. 3 is a block diagram illustrating an image display system according to one embodiment of the present invention.

Security processing system 10 is configured to provide or transmit image data subsets 20 to one or more image display systems such as an image display system 30 shown in FIG. 3. Security processing system 10 provides or transmits image data subsets 20 to an image display system in any suitable way. For example, separate connections of security processing system 10 may transmit separate image data subsets 20 to an image display system for increased security. In one embodiment, the connections may include one or more wired or wireless communication networks, such as the Internet, that are configured to electronically transmit image data subsets 20. In other embodiments, security processing system 10 may store image data subsets 20 to one or more portable media and the media may be physically provided or transported to an image display system.

In one embodiment, security processing system 10 encrypts each image data subset 20 prior to image data subsets 20 being provided to an image display system. To allow an image display system to decrypt image data subsets 20, security processing system 10 may generate an encryption key for each image data subset 20 and provide the encryption keys to the image display system. Security processing system 10 may also encrypt image data subsets 20 such that image display system 30 decrypts image data subsets 20 using previous stored encryption keys. For example, the image display system may include pre-designed or pre-programmed encryption components (e.g., hardware components in an integrated circuit) that include the encryption keys and are configured to decode image data subsets 20. As another example, the image display system may be configured to decrypt image data subsets 20 by knowing which algorithms were used to create image data subsets 20. Accordingly, image data subsets 20 may be processed in by an image display system without using previously stored encryption keys, or encryption keys may be provided that indicate which algorithms were used by security processing system 10.

The functions performed by security processing system 10 including those of image analysis system 14 and subset generation unit 16 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

FIG. 3 is a block diagram illustrating image display system 30. Image display system 30 processes image data subsets 20 generated by security processing system 10, as shown in FIG. 1, and generates corresponding displayed images (not shown) on a display surface (not shown) for viewing by a user. Each displayed image is defined to include any pictorial, graphical, or textural characters, symbols, illustrations, or other representations of information.

Display system 30 includes a sub-frame generation system 32 that is configured to define sets of sub-frames 38A through 38(*n*) (referred to individually as sub-frame set 38 or collectively as sub-frame sets 38) for each frame of each image data subset 20. As described in additional detail below with reference to the embodiments of FIGS. 6 and 7, sub-frame generation system 32 generates sub-frame sets 38 according to a geometric relationship the projectors in projector sets 36 and other relationship information of the projectors such as the particular characteristics of the projectors (e.g., whether a projector is multi-primary or individually colored (i.e. a color type of a projector), the relative luminance distribution between projectors, and the lens settings of the projectors).

In one embodiment, for each image frame in each image data subset 20, sub-frame generation system 32 generates one sub-frame for each of the projectors in a respective projector set 36 such that each sub-frame set 38 includes the same number of sub-frames as the number of projectors in a projector set 36.

Sub-frame generation system 32 provides sub-frame sets 38 to corresponding sets of projectors 36A through 36(*n*) (referred to individually as projector set 36 or collectively as projector sets 36) using respective connections 34A through 34(*n*). Each projector set 36 includes at least one projector that is configured to simultaneously project a respective sub-frame from sub-frame set 38 onto the display surface at overlapping and spatially offset positions with one or more sub-frames from the same set 38 or a different set 38 to produce the displayed image. The projectors may be any type of projection device including projection devices in a system such as a rear projection television and stand-alone projection devices.

It will be understood by persons of ordinary skill in the art that the sub-frames projected onto the display may have perspective distortions, and the pixels may not appear as perfect squares with no variation in the offsets and overlaps from pixel to pixel, such as that shown in FIGS. 5A-5D. Rather, in one form of the invention, the pixels of the sub-frames take the form of distorted quadrilaterals or some other shape, and the overlaps may vary as a function of position. Thus, terms such as "spatially shifted" and "spatially offset positions" as used herein are not limited to a particular pixel shape or fixed offsets and overlaps from pixel to pixel, but rather are intended to include any arbitrary pixel shape, and offsets and overlaps that may vary from pixel to pixel.

In one embodiment, display system 30 is configured to give the appearance to the human eye of high quality, high-resolution displayed images by displaying overlapping and spatially shifted lower-resolution sub-frames sets 38 from projector sets 36. In this embodiment, the projection of overlapping and spatially shifted sub-frames from sub-frames sets 38 may provide the appearance of enhanced resolution (i.e., higher resolution than the sub-frames of sub-frames sets 38 themselves) at least in the region of overlap of the displayed sub-frames.

Display system 30 also includes a camera 40 configured to capture images from the display surface and provide the images to a calibration unit 42. Calibration unit 42 processes the images from camera 40 and provides control signals associated with the images to sub-frame generation system 32. Camera 40 and calibration unit 42 automatically determine a geometric relationship or mapping between each projector in projector sets 36 and a hypothetical reference projector (not shown) that is used in an image formation model for generating optimal sub-frames for sub-frame sets 38. Camera 40 and calibration unit 42 may also automatically determine other relationship information of the projectors in projector sets 36 such as the particular characteristics of the projectors (e.g., whether a projector is multi-primary or individually colored (i.e. a color type of a projector), the relative luminance distribution between projectors, and the lens settings of the projectors)

The functions performed by sub-frame generation system 32 may be implemented in hardware, software, firmware, or any combination thereof. The implementation may be via a microprocessor, programmable logic device, or state machine. Components of the present invention may reside in software on one or more computer-readable mediums.

Image display system 30 may include hardware, software, firmware, or a combination of these. In one embodiment, one or more components of image display system 30 are included in a computer, computer server, or other microprocessor-based system capable of performing a sequence of logic operations. In addition, processing can be distributed throughout the system with individual portions being implemented in separate system components, such as in a networked or a multiple computing unit environment.

Figure 4A:
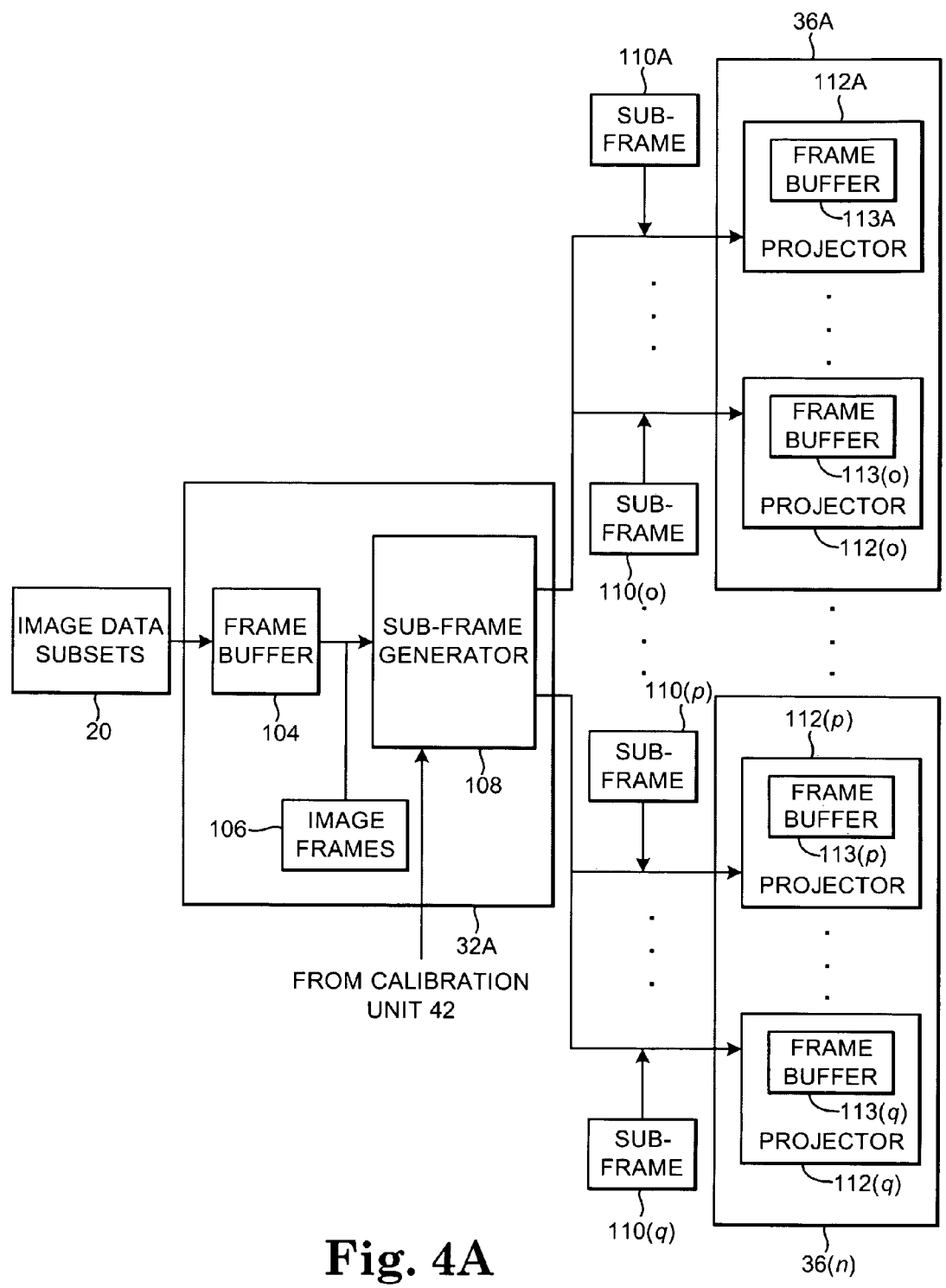
FIG. 4A is a block diagram illustrating additional details of the image display system of FIG. 3 according to one embodiment of the present invention.

FIG. 4A is a block diagram illustrating additional details of image display system 30 of FIG. 3 with an embodiment of sub-frame generation system 32A. As shown in the embodiment of FIG. 4A, sub-frame generation system 32A includes an image frame buffer 104 and a sub-frame generator 108. Each projector set 36 includes any number of projectors greater than or equal to one. In the embodiment shown in FIG. 4A, projector set 36A includes projectors 112A through 112 (o) where o is greater than or equal to one and represents the oth projector 112, and projector set 36(n) includes projectors 112(p) through 112(q) where p is greater than o and represents the pth projector 112 and q is greater than or equal to p and represents the qth projector 112. Each projector 112 includes an image frame buffer 113.

Image frame buffer 104 receives and buffers image data from image data subsets 20 to create image frames 106 for each image data subset 20. Sub-frame generator 108 processes image frames 106 to define corresponding image sub-frames for each image data subset 20. Sub-frame generator 108 processes image frames 106 to define corresponding image sub-frames 110A through 110(o). Sub-frames 110A through 110(o) collectively comprise sub-frame set 38A (shown in FIG. 3). Sub-frame generator 108 processes image frames 106 to define corresponding image sub-frames 110(p) through 110(q). Sub-frames 110(p) through 110(q) collectively comprise sub-frame set 38(n) (shown in FIG. 3).

In one embodiment, for each image frame 106, sub-frame generator 108 generates one sub-frame for each projector in projector sets 36. Sub-frames 110A through 110(q) are received by projectors 112A through 112(q), respectively, and stored in image frame buffers 113A through 113(q), respectively. Projectors 112A through 112(q) project sub-frames 110A through 110(q), respectively, onto the display surface to produce the displayed image for viewing by a user.

Image frame buffer 104 includes memory for storing image data 102 for one or more image frames 106. Thus, image frame buffer 104 constitutes a database of one or more image frames 106. Image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

Sub-frame generator 108 receives and processes image frames 106 to define sub-frames 110 for each projector in projector sets 36. Sub-frame generator 108 generates sub-frames 110 based on image data in image frames 106 and a geometric relationship of projectors 112 as determined by calibration unit 42. In one embodiment, sub-frame generator 108 generates image sub-frames 110 with a resolution that matches the resolution of projectors 112, which is less than the resolution of image frames 106 in one embodiment. Sub-frames 110 each include a plurality of columns and a plurality of rows of individual pixels representing a subset of an image frame 106.

Projectors 112 receive image sub-frames 110 from sub-frame generator 108 and, in one embodiment, simultaneously project the image sub-frames 110 onto the display surface at overlapping and spatially offset positions to produce the displayed image.

Sub-frame generator 108 determines appropriate values for the sub-frames 110 so that the displayed image produced by the projected sub-frames 110 is close in appearance to how the high-resolution image (e.g., image frame 106) from which the sub-frames 110 were derived would appear if displayed directly. Naïve overlapped projection of sub-frames 110 by different projectors 112 can lead to significant visual artifacts at the edges due to misregistration. In one embodiment, sub-frame generator 108 determines sub-frames 110 to be projected by each projector 112 so that the visibility of visual artifacts is minimized by using the geometric relationship of projectors 112 determined by calibration unit 42. Sub-frame generator 108 generates sub-frames 110 such that individual sub-frames 110 do not provide a high quality reproduction of the images of image data 12 when displayed with a different set of projectors or when additional image processing is performed on sub-frames 110 to attempt to combine sub-frames 110 in software. For example, individual sub-frames 110 may include only a selected grayscale range, a single color, added noise, or less than all component frames of each image.

In the embodiment of FIG. 4A, sub-frame generator 108 generates all sub-frames 110 using all of image data subsets 20. In one embodiment, sub-frame generator 108 generates sub-frames 110 according to the embodiment of FIG. 6 as described below. In other embodiments, sub-frame generator 108 generates all sub-frames 110 using all of image data subsets 20 according to other algorithms.

The functions performed by sub-frame generator 108 may be implemented in hardware, software, firmware, or any combination thereof. The implementation may be via a microprocessor, programmable logic device, or state machine. Components of the present invention may reside in software on one or more computer-readable mediums.

Figure 4B:
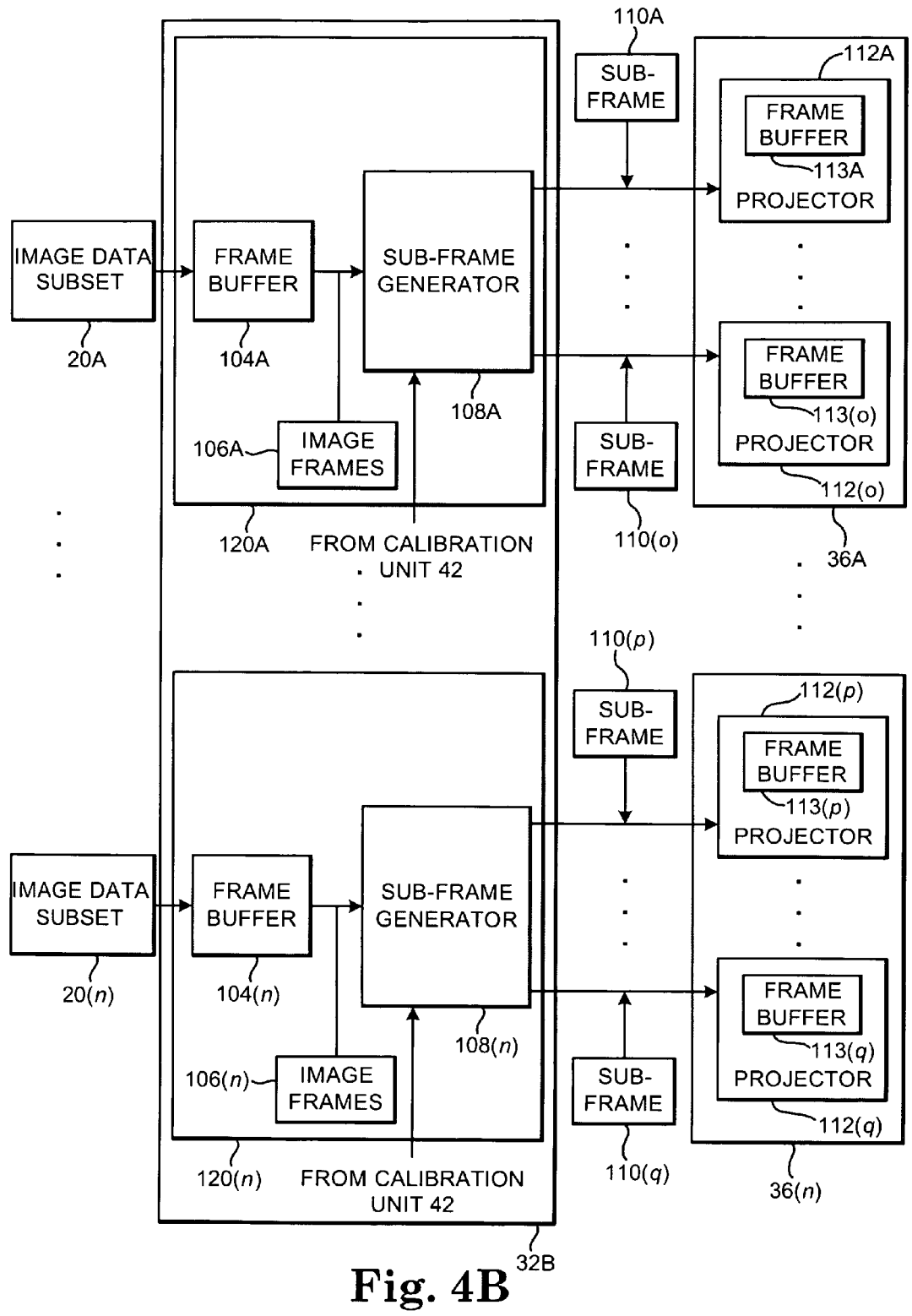
FIG. 4B is a block diagram illustrating additional details of the image display system of FIG. 3 according to one embodiment of the present invention.

FIG. 4B is a block diagram illustrating additional details of image display system 30 of FIG. 3 with an embodiment of sub-frame generation system 32B. As shown in the embodiment of FIG. 4B, sub-frame generation system 32B includes sub-frame generation units 120A through 120(n). Each sub-frame generation unit 120 includes an image frame buffer 104 and a sub-frame generator 108. Each projector set 36 includes any number of projectors greater than or equal to one. In the embodiment shown in FIG. 4B, projector set 36A includes projectors 112A through 112(o) where o is greater than or equal to one and represents the oth projector 112, and projector set 36(n) includes projectors 112(p) through 112(q) where p is greater than o and represents the pth projector 112 and q is greater than or equal top and represents the qth projector 112. Each projector 112 includes an image frame buffer 113.

Each image frame buffer 104 receives and buffers image data from one image data subset 20 to create image frames 106. Each sub-frame generator 108 processes image frames 106 to define corresponding image sub-frames an associated image data subset 20. Sub-frame generator 108A processes image frames 106 to define corresponding image sub-frames 110A through 110(o). Sub-frames 110A through 110(o) collectively comprise sub-frame set 38A (shown in FIG. 3). Sub-frame generator 108 (n) processes image frames 106 to define corresponding image sub-frames 110(p) through 10(q). Sub-frames 110(p) through 100(q) collectively comprise sub-frame set 38(n) (shown in FIG. 3).

In one embodiment, for each image frame 106A, sub-frame generator 108A generates one sub-frame for each projector in projector set 36A. Similarly, sub-frame generator 108(n) generates one sub-frame for each projector in projector set 36(n) for each image frame 106(n). Sub-frames 110A through 110(q) are received by projectors 112A through 112 (q), respectively, and stored in image frame buffers 113A through 113(q), respectively. Projectors 112A through 112(q) project sub-frames 110A through 110(q), respectively, onto the display surface to produce the displayed image for viewing by a user.

Each image frame buffer 104 includes memory for storing image data 102 for one or more image frames 106. Thus, each image frame buffer 104 constitutes a database of one or more image frames 106. Each image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

Each sub-frame generator 108 receives and processes image frames 106 to define sub-frames 110 for each projector in a projector set 36. Each sub-frame generator 108 generates sub-frames 110 based on image data in image frames 106 and a geometric relationship of projectors 112 as determined by calibration unit 42. In one embodiment, each sub-frame generator 108 generates image sub-frames 110 with a resolution that matches the resolution of projectors 112, which is less than the resolution of image frames 106 in one embodiment. Sub-frames 110 each include a plurality of columns and a plurality of rows of individual pixels representing a subset of an image frame 106.

Projectors 112 receive image sub-frames 110 from sub-frame generators 108 and, in one embodiment, simultaneously project the image sub-frames 110 onto the display surface at overlapping and spatially offset positions to produce the displayed image.

Each sub-frame generator 108 determines appropriate values for sub-frames 110 so that the displayed image produced by the projected sub-frames 110 is close in appearance to how the high-resolution image (e.g., image frame 106) from which sub-frames 110 were derived would appear if displayed directly. Naïve overlapped projection of sub-frames 110 by different projectors 112 can lead to significant visual artifacts at the edges due to misregistration. In one embodiment, each sub-frame generator 108 determines sub-frames 110 to be projected by each projector 112 so that the visibility of visual artifacts is minimized by using the geometric relationship of projectors 112 determined by calibration unit 42. Each sub-frame generator 108 generates sub-frames 110 such that individual sub-frames 110 do not provide a high quality reproduction of the images of image data 12 when displayed with a different set of projectors or when additional image processing is performed on sub-frames 110 to attempt to combine sub-frames 110 in software. For example, individual sub-frames 110 may include only a selected grayscale range, a single color, added noise, or less than all component frames of each image.

In the embodiment of FIG. 4B, each sub-frame generator 108 generates sub-frames 110 using less than all of image data subsets 20, e.g., one image data subset 20 as shown in FIG. 4B. In one embodiment, each sub-frame generator 108 generates sub-frames 110 according to the embodiment of FIG. 6 as described below. In another embodiment, each sub-frame generator 108 generates sub-frames 110 according to the embodiment of FIG. 7 as described below. In other embodiments, sub-frame generator 108 generates all sub-frames 110 using all of image data subsets 20 according to other algorithms.

The functions performed by each sub-frame generator 108 may be implemented in hardware, software, firmware, or any combination thereof. The implementation may be via a microprocessor, programmable logic device, or state machine. Components of the present invention may reside in software on one or more computer-readable mediums.

FIGS. 5A-5D are schematic diagrams illustrating the projection of four sub-frames 110A, 110B, 110C, and 110D from two or more sub-frame sets 38 according to one exemplary embodiment. In this embodiment, display system 30 includes four projectors 112.

Figure 5A:
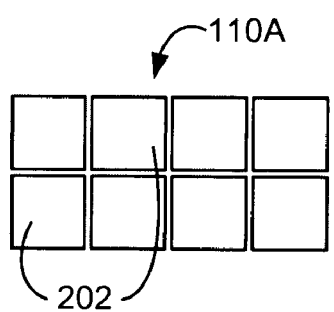
FIGS. 5A-5D are schematic diagrams illustrating the projection of four sub-frames according to one embodiment of the present invention.
Figure 5B:
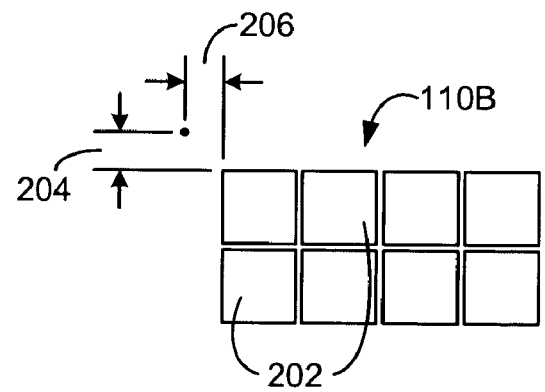
Figure 5C:
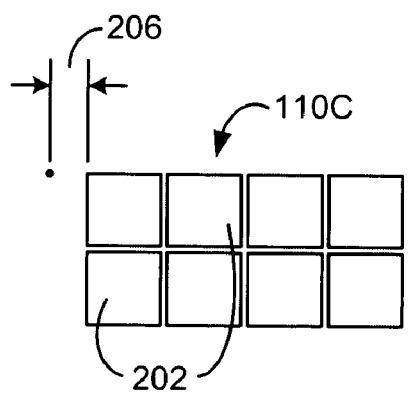
Figure 5D:
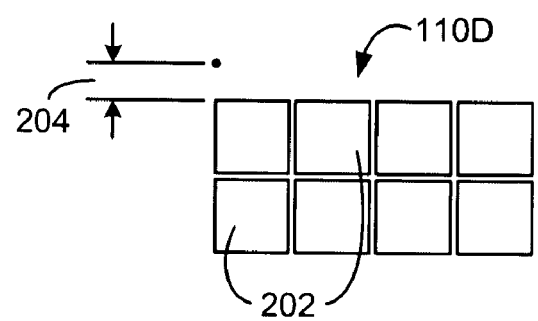

FIG. 5A illustrates the display of sub-frame 110A by a first projector 112A. As illustrated in FIG. 5B, a second projector 112B displays sub-frame 110B offset from sub-frame 110A by a vertical distance 204 and a horizontal distance 206. As illustrated in FIG. 5C, a third projector 112C displays sub-frame 10C offset from sub-frame 110A by horizontal distance 206. A fourth projector 112 displays sub-frame 110D offset from sub-frame 110A by vertical distance 204 as illustrated in FIG. 5D.

Sub-frame 110A is spatially offset from first sub-frame 110B by a predetermined distance. Similarly, sub-frame 110C is spatially offset from first sub-frame 110D by a predetermined distance. In one illustrative embodiment, vertical distance 204 and horizontal distance 206 are each approximately one-half of one pixel.

The display of sub-frames 110B, 110C, and 110D are spatially shifted relative to the display of sub-frame 110A by vertical distance 204, horizontal distance 206, or a combination of vertical distance 204 and horizontal distance 206. As such, pixels 202 of sub-frames 110A, 10B, 110C, and 110D overlap thereby producing the appearance of higher resolution pixels. The overlapped sub-frames 110A, 110B, 110C, and 110D also produce a brighter overall image than any of the sub-frames 110A, 110B, 110C, or 110D alone.

In other embodiments, sub-frames 110A, 10B, 110C, and 110D may be displayed at other spatial offsets relative to one another.

In one embodiment, sub-frames 110 have a lower resolution than image frames 106. Thus, sub-frames 110 are also referred to herein as low-resolution images or sub-frames 110, and image frames 106 are also referred to herein as high-resolution images or frames 106. The terms low resolution and high resolution are used herein in a comparative fashion, and are not limited to any particular minimum or maximum number of pixels.

In one embodiment, display system 30 produces a superimposed projected output that takes advantage of natural pixel mis-registration to provide a displayed image with a higher resolution than the individual sub-frames 110. In one embodiment, image formation due to multiple overlapped projectors 112 is modeled using a signal processing model. Optimal sub-frames 110 for each of the component projectors 112 are estimated by sub-frame generator 108 based on the model, such that the resulting image predicted by the signal processing model is as close as possible to the desired high-resolution image to be projected. In one embodiment, the signal processing model is used to derive values for the sub-frames 110 that minimize visual color artifacts that can occur due to offset projection of single-color sub-frames 110.

In one embodiment illustrated with reference to FIG. 6, sub-frame generation system 32 is configured to generate sub-frames 110 based on the maximization of a probability that, given a desired high resolution image, a simulated high-resolution image that is a function of the sub-frame values, is the same as the given, desired high-resolution image. If the generated sub-frames 110 are optimal, the simulated high-resolution image will be as close as possible to the desired high-resolution image. The generation of optimal sub-frames 110 based on a simulated high-resolution image and a desired high-resolution image is described in further detail below with reference to FIG. 6.

Figure 6:
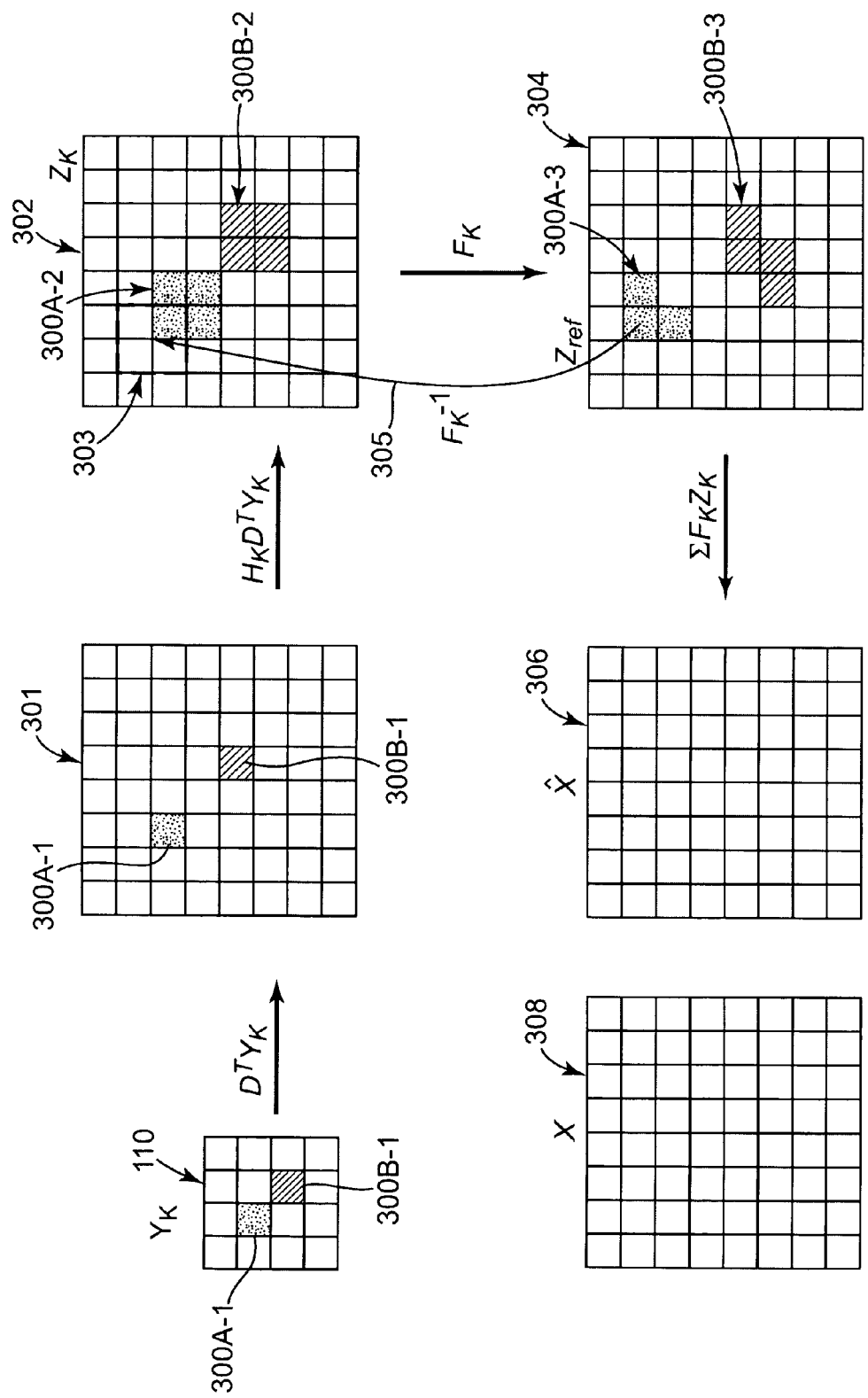
FIG. 6 is a diagram illustrating a model of an image formation process according to one embodiment of the present invention.

FIG. 6 is a diagram illustrating a model of an image formation process performed by sub-frame generator 108 in sub-frame generation system 32A or by each sub-frame generator 108 in sub-frame generation system 32B. The sub-frames 110 are represented in the model by $Y_k$, where "k" is an index for identifying the individual projectors 112. Thus, $Y_1$, for example, corresponds to a sub-frame 110 for a first projector 112, $Y_2$ corresponds to a sub-frame 110 for a second projector 112, etc. Two of the sixteen pixels of the sub-frame 110 shown in FIG. 6 are highlighted, and identified by reference numbers 300A-1 and 300B-1. The sub-frames 110 ($Y_k$) are represented on a hypothetical high-resolution grid by up-sampling (represented by $D^T$) to create up-sampled image 301. The up-sampled image 301 is filtered with an interpolating filter (represented by $H_k$) to create a high-resolution image 302 ($Z_k$) with "chunky pixels". This relationship is expressed in the following Equation I:

$$Z_k = H_k D^T Y_k \quad \text{Equation I}$$

where:
  k=index for identifying the projectors 112;
  $Z_k$=low-resolution sub-frame 110 of the kth projector 112 on a hypothetical high-resolution grid;
  $H_k$=Interpolating filter for low-resolution sub-frame 110 from kth projector 112;
  $D^T$=up-sampling matrix; and
  $Y_k$=low-resolution sub-frame 110 of the kth projector 112.

The low-resolution sub-frame pixel data ($Y_k$) is expanded with the up-sampling matrix ($D^T$) so that the sub-frames 110 ($Y_k$) can be represented on a high-resolution grid. The interpolating filter ($H_k$) fills in the missing pixel data produced by up-sampling. In the embodiment shown in FIG. 6, pixel 300A-1 from the original sub-frame 110 ($Y_k$) corresponds to four pixels 300A-2 in the high-resolution image 302 ($Z_k$), and pixel 300B-1 from the original sub-frame 110 ($Y_k$) corresponds to four pixels 3003B-2 in the high-resolution image 302 ($Z_k$). The resulting image 302 ($Z_k$) in Equation I models the output of the kth projector 112 if there was no relative distortion or noise in the projection process. Relative geometric distortion between the projected component sub-frames 110 results due to the different optical paths and locations of the component projectors 112. A geometric transformation is modeled with the operator, $F_k$, which maps coordinates in the frame buffer 113 of the kth projector 112 to the frame buffer of the hypothetical reference projector with sub-pixel accuracy, to generate a warped image 304 ($Z_{ref}$). In one embodiment, $F_k$ is linear with respect to pixel intensities, but is non-linear with respect to the coordinate transformations. As shown in FIG. 6, the four pixels 300A-2 in image 302 are mapped to the three pixels 300A-3 in image 304, and the four pixels 300B-2 in image 302 are mapped to the four pixels 300B-3 in image 304.

In one embodiment, the geometric mapping ($F_k$) is a floating-point mapping, but the destinations in the mapping are on an integer grid in image 304. Thus, it is possible for multiple pixels in image 302 to be mapped to the same pixel location in image 304, resulting in missing pixels in image 304. To avoid this situation, in one embodiment, during the forward mapping ($F_k$), the inverse mapping ($F_k^{-1}$) is also utilized as indicated at 305 in FIG. 6. Each destination pixel in image 304 is back projected (i.e., $F_k^{-1}$) to find the corresponding location in image 302. For the embodiment shown in FIG. 6, the location in image 302 corresponding to the upper-left pixel of the pixels 300A-3 in image 304 is the location at the upper-left corner of the group of pixels 300A-2. In one embodiment, the values for the pixels neighboring the identified location in image 302 are combined (e.g., averaged) to form the value for the corresponding pixel in image 304. Thus, for the example shown in FIG. 6, the value for the upper-left pixel in the group of pixels 300A-3 in image 304 is determined by averaging the values for the four pixels within the frame 303 in image 302.

In another embodiment, the forward geometric mapping or warp ($F_k$) is implemented directly, and the inverse mapping ($F_k^{-1}$) is not used. In one form of this embodiment, a scatter operation is performed to eliminate missing pixels. That is, when a pixel in image 302 is mapped to a floating point location in image 304, some of the image data for the pixel is essentially scattered to multiple pixels neighboring the floating point location in image 304. Thus, each pixel in image 304 may receive contributions from multiple pixels in image 302, and each pixel in image 304 is normalized based on the number of contributions it receives.

A superposition/summation of such warped images 304 from all of the component projectors 112 forms a hypothetical or simulated high-resolution image 306 (X-hat) in the reference projector frame buffer, as represented in the following Equation II:

$$\hat{X} = \sum_k F_k Z_k \quad \text{Equation II}$$

where:
  k=index for identifying the projectors 112;
  X-hat=hypothetical or simulated high-resolution image 306 in the reference projector frame buffer;
  $F_k$=operator that maps a low-resolution sub-frame 110 of the kth projector 112 on a hypothetical high-resolution grid to the reference projector frame buffer; and
  $Z_k$=low-resolution sub-frame 110 of kth projector 112 on a hypothetical high-resolution grid, as defined in Equation I.

In one embodiment, the formation of simulated high-resolution image 306 (X-hat) in the reference projector frame buffer may remove distortion added to image data subsets 20 by security processing system 10. Accordingly, simulated high-resolution image 306 (X-hat) may be formed using hardware components in one embodiment to prevent simulated high-resolution image 306 (X-hat) from being tapped out of image display system 30.

If the simulated high-resolution image 306 (X-hat) in the reference projector frame buffer is identical to a given (desired) high-resolution image 308 (X), the system of component low-resolution projectors 112 would be equivalent to a hypothetical high-resolution projector placed at the same location as the hypothetical reference projector and sharing its optical path. In one embodiment, the desired high-resolution images 308 are the high-resolution image frames 106 received by sub-frame generator 108.

In one embodiment, the deviation of the simulated high-resolution image 306 (X-hat) from the desired high-resolution image 308 (X) is modeled as shown in the following Equation III:

$$X = \hat{X} + \eta \quad \text{Equation III}$$

where:
X=desired high-resolution frame 308;
X-hat=hypothetical or simulated high-resolution frame 306 in the reference projector frame buffer; and
η=error or noise term.

As shown in Equation III, the desired high-resolution image 308 (X) is defined as the simulated high-resolution image 306 (X-hat) plus η, which in one embodiment represents zero mean white Gaussian noise.

The solution for the optimal sub-frame data ($Y_k^*$) for the sub-frames 110 is formulated as the optimization given in the following Equation IV:

$$Y_k^* = \operatorname*{argmax}_{Y_k} P(\hat{X} \mid X) \quad \text{Equation IV}$$

where:
k=index for identifying the projectors 112;
$Y_k^*$=optimum low-resolution sub-frame 110 of the kth projector 112;
$Y_k$=low-resolution sub-frame 110 of the kth projector 112;
X-hat=hypothetical or simulated high-resolution frame 306 in the reference projector frame buffer, as defined in Equation II;
X=desired high-resolution frame 308; and
P(X-hat|X)=probability of X-hat given X.

Thus, as indicated by Equation IV, the goal of the optimization is to determine the sub-frame values ($Y_k$) that maximize the probability of X-hat given X. Given a desired high-resolution image 308 (X) to be projected, sub-frame generator 108 determines the component sub-frames 110 that maximize the probability that the simulated high-resolution image 306 (X-hat) is the same as or matches the "true" high-resolution image 308 (X).

Using Bayes rule, the probability P(X-hat|X) in Equation IV can be written as shown in the following Equation V:

$$P(\hat{X} \mid X) = \frac{P(X \mid \hat{X}) P(\hat{X})}{P(X)} \quad \text{Equation V}$$

where:
X-hat=hypothetical or simulated high-resolution frame 306 in the reference projector frame buffer, as defined in Equation II;
X=desired high-resolution frame 308;
P(X-hat|X)=probability of X-hat given X;
P(X|X-hat)=probability of X given X-hat;
P(X-hat)=prior probability of X-hat; and
P(X)=prior probability of X.

The term P(X) in Equation V is a known constant. If X-hat is given, then, referring to Equation III, X depends only on the noise term, η, which is Gaussian. Thus, the term P(X|X-hat) in Equation V will have a Gaussian form as shown in the following Equation VI:

$$P(X \mid \hat{X}) = \frac{1}{C} e^{-\frac{\|X - \hat{X}\|^2}{2\sigma^2}} \quad \text{Equation VI}$$

where:
X-hat=hypothetical or simulated high-resolution frame 306 in the reference projector frame buffer, as defined in Equation II;
X=desired high-resolution frame 308;
P(X|X-hat)=probability of X given X-hat;
C=normalization constant; and
σ=variance of the noise term, η.

To provide a solution that is robust to minor calibration errors and noise, a "smoothness" requirement is imposed on X-hat. In other words, it is assumed that good simulated images 306 have certain properties. The smoothness requirement according to one embodiment is expressed in terms of a desired Gaussian prior probability distribution for X-hat given by the following Equation VII:

$$P(\hat{X}) = \frac{1}{Z(\beta)} e^{-\{\beta^2 (\|\nabla \hat{X}\|^2)\}} \quad \text{Equation VII}$$

where:
P(X-hat)=prior probability of X-hat;
β=smoothing constant;
Z(β)=normalization function;
∇=gradient operator; and
X-hat=hypothetical or simulated high-resolution frame 306 in the reference projector frame buffer, as defined in Equation II.

In another embodiment, the smoothness requirement is based on a prior Laplacian model, and is expressed in terms of a probability distribution for X-hat given by the following Equation VIII:

$$P(\hat{X}) = \frac{1}{Z(\beta)} e^{-\{\beta (\|\nabla \hat{X}\|)\}} \quad \text{Equation VIII}$$

where:
P(X-hat)=prior probability of X-hat;
β=smoothing constant;
Z(β)=normalization function;
∇=gradient operator; and
X-hat=hypothetical or simulated high-resolution frame 306 in the reference projector frame buffer, as defined in Equation II.

The following discussion assumes that the probability distribution given in Equation VII, rather than Equation VIII, is being used. As will be understood by persons of ordinary skill in the art, a similar procedure would be followed if Equation VIII were used. Inserting the probability distributions from Equations VI and VII into Equation V, and inserting the result into Equation W, results in a maximization problem involving the product of two probability distributions (note that the probability P(X) is a known constant and goes away in the calculation). By taking the negative logarithm, the exponents go away, the product of the two probability distributions becomes a sum of two probability distributions, and the maximization problem given in Equation IV is transformed into a function minimization problem, as shown in the following Equation IX:

$$Y_k^* = \underset{Y_k}{\mathrm{argmax}} \|X - \hat{X}\|^2 + \beta^2 \|\nabla \hat{X}\|^2 \qquad \text{Equation IX}$$

where:
  k=index for identifying the projectors 112;
  $Y_k^*$=optimum low-resolution sub-frame 110 of the kth projector 112;
  $Y_k$=low-resolution sub-frame 110 of the kth projector 112;
  X-hat=hypothetical or simulated high-resolution frame 306 in the reference projector frame buffer, as defined in Equation II;
  X=desired high-resolution frame 308;
  β=smoothing constant; and
  ∇=gradient operator.

The function minimization problem given in Equation IX is solved by substituting the definition of X-hat from Equation II into Equation 1x and taking the derivative with respect to $Y_k$, which results in an iterative algorithm given by the following Equation X:

$$Y_k^{(n+1)} = Y_k^{(n)} - \Theta\{DH_k^T F_k^T[(\hat{X}^{(n)} - X) + \beta^2 \nabla^2 \hat{X}^{(n)}]\} \qquad \text{Equation X}$$

where:
  k=index for identifying the projectors 112;
  n=index for identifying iterations;
  $Y_k^{(n+1)}$=low-resolution sub-frame 110 for the kth projector 112 for iteration number n+1;
  $Y_k^{(n)}$=low-resolution sub-frame 110 for the kth projector 112 for iteration number n;
  Θ=momentum parameter indicating the fraction of error to be incorporated at each iteration;
  D=down-sampling matrix;
  $H_k^T$=Transpose of interpolating filter, $H_k$, from Equation I (in the image domain, $H_k^T$ is a flipped version of $H_k$);
  $F_k^T$=Transpose of operator, $F_k$, from Equation II (in the image domain, $F_k^T$ is the inverse of the warp denoted by $F_k$);
  $\hat{X}^{(n)}$=hypothetical or simulated high-resolution frame 306 in the reference projector frame buffer, as defined in Equation II, for iteration number n;
  X=desired high-resolution frame 308;
  β=smoothing constant; and
  $\nabla^2$=Laplacian operator.

Equation X may be intuitively understood as an iterative process of computing an error in the hypothetical reference projector coordinate system and projecting it back onto the sub-frame data. In one embodiment, sub-frame generator 108 is configured to generate sub-frames 110 in real-time using Equation X. The generated sub-frames 110 are optimal in one embodiment because they maximize the probability that the simulated high-resolution image 306 (X-hat) is the same as the desired high-resolution image 308 (A), and they minimize the error between the simulated high-resolution image 306 and the desired high-resolution image 308. Equation X can be implemented very efficiently with conventional image processing operations (e.g., transformations, down-sampling, and filtering). The iterative algorithm given by Equation X converges rapidly in a few iterations and is very efficient in terms of memory and computation (e.g., a single iteration uses two rows in memory; and multiple iterations may also be rolled into a single step). The iterative algorithm given by Equation X is suitable for real-time implementation, and may be used to generate optimal sub-frames 110 at video rates, for example.

To begin the iterative algorithm defined in Equation X, an initial guess, $Y_k^{(0)}$, for the sub-frames 110 is determined. In one embodiment, the initial guess for the sub-frames 110 is determined by texture mapping the desired high-resolution frame 308 onto the sub-frames 110. In one embodiment, the initial guess is determined from the following Equation XI:

$$Y_k^{(0)} = D B_k F_k^T X \qquad \text{Equation XI}$$

where:
  k=index for identifying the projectors 112;
  $Y_k^{(0)}$=initial guess at the sub-frame data for the sub-frame 110 for the kth projector 112;
  D=down-sampling matrix;
  $B_k$=interpolation filter;
  $F_k^T$=Transpose of operator, $F_k$, from Equation II (in the image domain, $F_k^T$ is the inverse of the warp denoted by $F_k$); and
  X=desired high-resolution frame 308.

Thus, as indicated by Equation XI, the initial guess ($Y_k^{(0)}$) is determined by performing a geometric transformation ($F_k^T$) on the desired high-resolution frame 308 (X), and filtering ($B_k$) and down-sampling (D) the result. The particular combination of neighboring pixels from the desired high-resolution frame 308 that are used in generating the initial guess ($Y_k^{(0)}$) will depend on the selected filter kernel for the interpolation filter ($B_k$).

In another embodiment, the initial guess, $Y_k^{(0)}$, for the sub-frames 110 is determined from the following Equation XII $$Y_k^{(0)} = D F_k^T X \qquad \text{Equation XII}$$

where:
  k=index for identifying the projectors 112;
  $Y_k^{(0)}$=initial guess at the sub-frame data for the sub-frame 110 for the kth projector 112;
  D=down-sampling matrix;
  $F_k^T$=Transpose of operator, $F_k$, from Equation II (in the image domain, $F_k^T$ is the inverse of the warp denoted by $F_k$); and
  X=desired high-resolution frame 308.

Equation XII is the same as Equation XI, except that the interpolation filter ($B_k$) is not used.

Several techniques are available to determine the geometric mapping ($F_k$) between each projector 112 and the hypothetical reference projector, including manually establishing the mappings, or using camera 40 and calibration unit 42 to automatically determine the mappings. In one embodiment, if camera 40 and calibration unit 42 are used, the geometric mappings between each projector 112 and camera 40 are determined by calibration unit 42. These projector-to-camera mappings may be denoted by $T_k$, where k is an index for identifying projectors 112. Based on the projector-to-camera mappings ($T_k$), the geometric mappings ($F_k$) between each projector 112 and the hypothetical reference projector are determined by calibration unit 42, and provided to sub-frame generator 108. For example, in a display system 30 with two projectors 112A and 112B, assuming the first projector 112A is the hypothetical reference projector, the geometric mapping of the second projector 112B to the first (reference) projector 112A can be determined as shown in the following Equation XIII:

$$F_2 = T_2 T_1^{-1} \quad \text{Equation XIII}$$

where:
$F_2$=operator that maps a low-resolution sub-frame 110 of the second projector 112B to the first (reference) projector 112A;
$T_1$=geometric mapping between the first projector 112A and the camera 40; and
$T_2$=geometric mapping between the second projector 112B and the camera 40.

In one embodiment, the geometric mappings ($F_k$) are determined once by calibration unit 42, and provided to sub-frame generator 108. In another embodiment, calibration unit 42 continually determines (e.g., once per frame 106) the geometric mappings ($F_k$), and continually provides updated values for the mappings to sub-frame generator 108.

Figure 7:
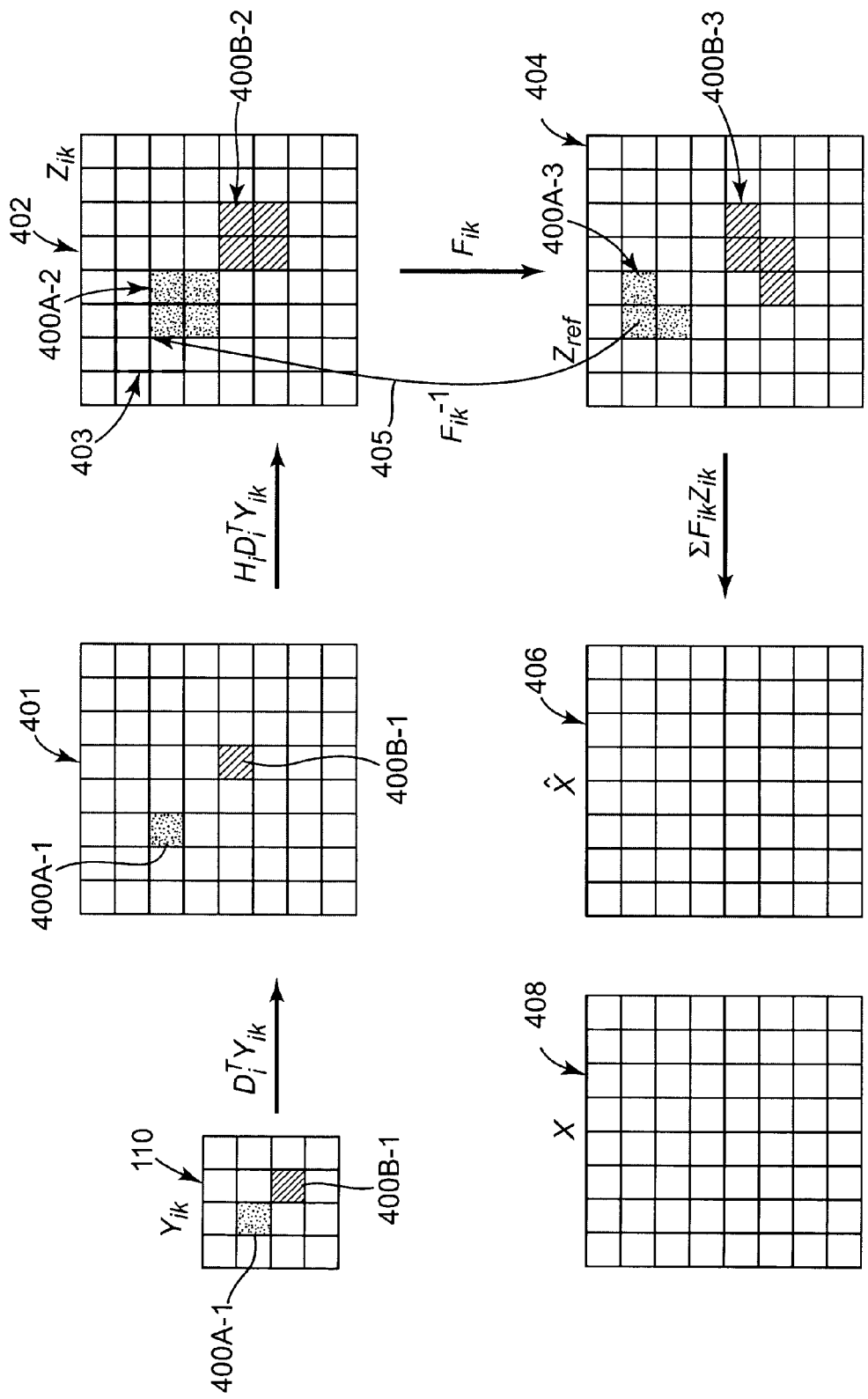
FIG. 7 is a diagram illustrating a model of an image formation process according to one embodiment of the present invention.

In another embodiment illustrated by the embodiment of FIG. 7, sub-frame generator 108 determines and generates single-color sub-frames 110 for each projector 112 that minimize color aliasing due to offset projection. This process may be thought of as inverse de-mosaicking. A de-mosaicking process seeks to synthesize a high-resolution, full color image free of color aliasing given color samples taken at relative offsets. In one embodiment, sub-frame generator 108 essentially performs the inverse of this process and determines the colorant values to be projected at relative offsets, given a full color high-resolution image 106. The generation of optimal sub-frames 110 based on a simulated high-resolution image and a desired high-resolution image is described in further detail below with reference to FIG. 7.

FIG. 7 is a diagram illustrating a model of an image formation process performed by sub-frame generator 108 in sub-frame generation system 32A or by each sub-frame generator 108 in sub-frame generation system 32B. The sub-frames 110 are represented in the model by $Y_{ik}$, where "k" is an index for identifying individual sub-frames 110, and "i" is an index for identifying color planes. Two of the sixteen pixels of the sub-frame 110 shown in FIG. 7 are highlighted, and identified by reference numbers 400A-1 and 400B-1. The sub-frames 110 ($Y_{ik}$) are represented on a hypothetical high-resolution grid by up-sampling (represented by $D_i^T$) to create up-sampled image 401. The up-sampled image 401 is filtered with an interpolating filter (represented by $H_i$) to create a high-resolution image 402 ($Z_{ik}$) with "chunky pixels". This relationship is expressed in the following Equation XIV:

$$Z_{ik} = H_i D_i^T Y_{ik} \quad \text{Equation XIV}$$

where:
k=index for identifying individual sub-frames 110;
i=index for identifying color planes;
$Z_{ik}$=kth low-resolution sub-frame 110 in the ith color plane on a hypothetical high-resolution grid;
$H_i$=Interpolating filter for low-resolution sub-frames 110 in the ith color plane;
$D_i^T$=up-sampling matrix for sub-frames 110 in the ith color plane; and
$Y_{ik}$=kth low-resolution sub-frame 110 in the ith color plane.

The low-resolution sub-frame pixel data ($Y_{ik}$) is expanded with the up-sampling matrix ($D_i^T$) so that the sub-frames 110 ($Y_{ik}$) can be represented on a high-resolution grid. The interpolating filter ($H_i$) fills in the missing pixel data produced by up-sampling. In the embodiment shown in FIG. 7, pixel 400A-1 from the original sub-frame 110 ($Y_{ik}$) corresponds to four pixels 400A-2 in the high-resolution image 402 ($Z_{ik}$), and pixel 400B-1 from the original sub-frame 110 ($Y_{ik}$) corresponds to four pixels 400B-2 in the high-resolution image 402 ($Z_{ik}$). The resulting image 402 ($Z_{ik}$) in Equation XIV models the output of the projectors 112 if there was no relative distortion or noise in the projection process. Relative geometric distortion between the projected component sub-frames 110 results due to the different optical paths and locations of the component projectors 112. A geometric transformation is modeled with the operator, $F_{ik}$, which maps coordinates in the frame buffer 113 of a projector 112 to the frame buffer of the hypothetical reference projector with sub-pixel accuracy, to generate a warped image 404 ($Z_{ref}$). In one embodiment, $F_{ik}$ is linear with respect to pixel intensities, but is non-linear with respect to the coordinate transformations. As shown in FIG. 7, the four pixels 400A-2 in image 402 are mapped to the three pixels 400A-3 in image 404, and the four pixels 400B-2 in image 402 are mapped to the four pixels 400B-3 in image 404.

In one embodiment, the geometric mapping ($F_{ik}$) is a floating-point mapping, but the destinations in the mapping are on an integer grid in image 404. Thus, it is possible for multiple pixels in image 402 to be mapped to the same pixel location in image 404, resulting in missing pixels in image 404. To avoid this situation, in one embodiment, during the forward mapping ($F_{ik}$), the inverse mapping ($F_{ik}^{-1}$) is also utilized as indicated at 405 in FIG. 7. Each destination pixel in image 404 is back projected (i.e., $F_{ik}^{-1}$) to find the corresponding location in image 402. For the embodiment shown in FIG. 7, the location in image 402 corresponding to the upper-left pixel of the pixels 400A-3 in image 404 is the location at the upper-left corner of the group of pixels 400A-2. In one embodiment, the values for the pixels neighboring the identified location in image 402 are combined (e.g., averaged) to form the value for the corresponding pixel in image 404. Thus, for the example shown in FIG. 7, the value for the upper-left pixel in the group of pixels 400A-3 in image 404 is determined by averaging the values for the four pixels within the frame 403 in image 402.

In another embodiment, the forward geometric mapping or warp ($F_k$) is implemented directly, and the inverse mapping ($F_k^{-1}$) is not used. In one form of this embodiment, a scatter operation is performed to eliminate missing pixels. That is, when a pixel in image 402 is mapped to a floating point location in image 404, some of the image data for the pixel is essentially scattered to multiple pixels neighboring the floating point location in image 404. Thus, each pixel in image 404 may receive contributions from multiple pixels in image 402, and each pixel in image 404 is normalized based on the number of contributions it receives.

A superposition/summation of such warped images 404 from all of the component projectors 112 in a given color plane forms a hypothetical or simulated high-resolution image ($\hat{X}_i$) for that color plane in the reference projector frame buffer, as represented in the following Equation XV:

$$\hat{X}_i = \sum_k F_{ik} Z_{ik} \quad \text{Equation XV}$$

where:
- k=index for identifying individual sub-frames 110;
- i=index for identifying color planes;
- X-hat$_i$=hypothetical or simulated high-resolution image for the ith color plane in the reference projector frame buffer;
- F$_{ik}$=operator that maps the kth low-resolution sub-frame 110 in the ith color plane on a hypothetical high-resolution grid to the reference projector frame buffer; and
- Z$_{ik}$=kth low-resolution sub-frame 110 in the ith color plane on a hypothetical high-resolution grid, as defined in Equation XIV.

A hypothetical or simulated image 406 (X-hat) is represented by the following Equation XVI:

$$\hat{X} = [\hat{X}_1 \hat{X}_2 \ldots \hat{X}_N]^T \qquad \text{Equation XVI}$$

where:
- X-hat=hypothetical or simulated high-resolution image in the reference projector frame buffer;
- X-hat$_1$=hypothetical or simulated high-resolution image for the first color plane in the reference projector frame buffer, as defined in Equation XV;
- X-hat$_2$=hypothetical or simulated high-resolution image for the second color plane in the reference projector frame buffer, as defined in Equation XV;
- X-hat$_N$=hypothetical or simulated high-resolution image for the Nth color plane in the reference projector frame buffer, as defined in Equation XV; and
- N=number of color planes.

If the simulated high-resolution image 406 (X-hat) in the reference projector frame buffer is identical to a given (desired) high-resolution image 408 (X), the system of component low-resolution projectors 112 would be equivalent to a hypothetical high-resolution projector placed at the same location as the hypothetical reference projector and sharing its optical path. In one embodiment, the desired high-resolution images 408 are the high-resolution image frames 106 received by sub-frame generator 108.

In one embodiment, the deviation of the simulated high-resolution image 406 (X-hat) from the desired high-resolution image 408 (X) is modeled as shown in the following Equation XVII:

$$X = \hat{X} + \eta \qquad \text{Equation XVII}$$

where:
- X=desired high-resolution frame 408;
- X-hat=hypothetical or simulated high-resolution frame 406 in the reference projector frame buffer; and
- η=error or noise term.

As shown in Equation XVII, the desired high-resolution image 408 (X) is defined as the simulated high-resolution image 406 (X-hat) plus η, which in one embodiment represents zero mean white Gaussian noise.

The solution for the optimal sub-frame data (Y$_{ik}$*) for the sub-frames 110 is formulated as the optimization given in the following Equation XVIII:

$$Y_{ik}^* = \underset{Y_{ik}}{\operatorname{argmax}} P(\hat{X} \mid X) \qquad \text{Equation XVIII}$$

where:
- k=index for identifying individual sub-frames 110;
- i=index for identifying color planes;
- Y$_{ik}$*=optimum low-resolution sub-frame data for the kth sub-frame 110 in the ith color plane;
- Y$_{ik}$=kth low-resolution sub-frame 110 in the ith color plane;
- X-hat=hypothetical or simulated high-resolution frame 406 in the reference projector frame buffer, as defined in Equation XVI;
- X=desired high-resolution frame 408; and
- P(X-hat|X)=probability of X-hat given X.

Thus, as indicated by Equation XVIII, the goal of the optimization is to determine the sub-frame values (Y$_{ik}$) that maximize the probability of X-hat given X. Given a desired high-resolution image 408 (X) to be projected, sub-frame generator 108 determines the component sub-frames 110 that maximize the probability that the simulated high-resolution image 406 (X-hat) is the same as or matches the "true" high-resolution image 408 (X).

Using Bayes rule, the probability P(X-hat|X) in Equation XVIII can be written as shown in the following Equation XIX:

$$P(\hat{X} \mid X) = \frac{P(X \mid \hat{X}) P(\hat{X})}{P(X)} \qquad \text{Equation XIX}$$

where:
- X-hat=hypothetical or simulated high-resolution frame 406 in the reference projector frame buffer, as defined in Equation XVI;
- X=desired high-resolution frame 408;
- P(X-hat|X)=probability of X-hat given X;
- P(X|X-hat)=probability of X given X-hat;
- P(X-hat)=prior probability of X-hat; and
- P(X)=prior probability of X.

The term P(X) in Equation XIX is a known constant. If X-hat is given, then, referring to Equation XVII, X depends only on the noise term, 71, which is Gaussian. Thus, the term P(X|X-hat) in Equation XIX will have a Gaussian form as shown in the following Equation XX:

$$P(X \mid \hat{X}) = \frac{1}{C} e^{-\sum_i \frac{(\|X_i - \hat{X}_i\|^2)}{2\sigma_i^2}} \qquad \text{Equation XX}$$

where:
- X-hat=hypothetical or simulated high-resolution frame 406 in the reference projector frame buffer, as defined in Equation XVI;
- X=desired high-resolution frame 408;
- P(X|X-hat)=probability of X given X-hat;
- C=normalization constant;
- i=index for identifying color planes;
- X$_i$=ith color plane of the desired high-resolution frame 408;
- X-hat$_i$=hypothetical or simulated high-resolution image for the ith color plane in the reference projector frame buffer, as defined in Equation XV; and
- σ$_i$=variance of the noise term, η, for the ith color plane.

To provide a solution that is robust to minor calibration errors and noise, a "smoothness" requirement is imposed on X-hat. In other words, it is assumed that good simulated images 406 have certain properties. For example, for most good color images, the luminance and chrominance derivatives are related by a certain value. In one embodiment, a smoothness requirement is imposed on the luminance and chrominance of the X-hat image based on a "Hel-Or" color prior model, which is a conventional color model known to those of ordinary skill in the art. The smoothness requirement according to one embodiment is expressed in terms of a desired probability distribution for X-hat given by the following Equation XXI:

$$P(\hat{X}) = \frac{1}{Z(\alpha, \beta)} e^{-\{\alpha^2(\|\nabla \hat{C}_1\|^2 + \|\nabla \hat{C}_2\|^2) + \beta^2(\|\nabla \hat{L}\|^2)\}} \quad \text{Equation XXI}$$

where:
P(X-hat)=prior probability of X-hat;
α and β=smoothing constants;
Z(α, β)=normalization function;
∇=gradient operator; and
C-hat$_1$=first chrominance channel of X-hat;
C-hat$_2$=second chrominance channel of X-hat; and
L-hat=luminance of X-hat.

In another embodiment, the smoothness requirement is based on a prior Laplacian model, and is expressed in terms of a probability distribution for X-hat given by the following Equation XXII:

$$P(\hat{X}) = \frac{1}{Z(\alpha, \beta)} e^{-\{\alpha(|\nabla \hat{C}_1| + |\nabla \hat{C}_2|) + \beta(|\nabla \hat{L}|)\}} \quad \text{Equation XXII}$$

where:
P(X-hat)=prior probability of X-hat;
α and β=smoothing constants;
Z(α, β)=normalization function;
∇=gradient operator; and
C-hat$_1$=first chrominance channel of X-hat;
C-hat$_2$=second chrominance channel of X-hat; and
L-hat=luminance of X-hat.

The following discussion assumes that the probability distribution given in Equation XXI, rather than Equation XXII, is being used. As will be understood by persons of ordinary skill in the art, a similar procedure would be followed if Equation XXII were used. Inserting the probability distributions from Equations XX and XXI into Equation XIX, and inserting the result into Equation XVIII, results in a maximization problem involving the product of two probability distributions (note that the probability P(X) is a known constant and goes away in the calculation). By taking the negative logarithm, the exponents go away, the product of the two probability distributions becomes a sum of two probability distributions, and the maximization problem given in Equation V is transformed into a function minimization problem, as shown in the following Equation XXIII:

$$Y_{ik}^* = \underset{Y_{ik}}{\operatorname{argmin}} \sum_{i=1}^{N} \|X_i - \hat{X}_i\|^2 +$$

$$\alpha^2 \left\{ \left\| \nabla \left( \sum_{i=1}^{N} T_{C_1 i} \hat{X}_i \right) \right\|^2 + \left\| \nabla \left( \sum_{i=1}^{N} T_{C_2 i} \hat{X}_i \right) \right\|^2 \right\} +$$

$$\beta^2 \left\| \nabla \left( \sum_{i=1}^{N} T_{Li} \hat{X}_i \right) \right\|^2 \quad \text{Equation XXIII}$$

where:
k=index for identifying individual sub-frames 110;
i=index for identifying color planes;

$Y_{ik}$*=optimum low-resolution sub-frame data for the kth sub-frame 110 in the ith color plane;
$Y_{ik}$=kth low-resolution sub-frame 110 in the ith color plane;
N=number of color planes;
$X_i$=ith color plane of the desired high-resolution frame 408;
X-hat$_i$=hypothetical or simulated high-resolution image for the ith color plane in the reference projector frame buffer, as defined in Equation XV;
α and β=smoothing constants;
∇=gradient operator;
$T_{C1i}$=ith element in the second row in a color transformation matrix, T, for transforming the first chrominance channel of X-hat;
$T_{C2i}$=ith element in the third row in a color transformation matrix, T, for transforming the second chrominance channel of X-hat; and
$T_{Li}$=ith element in the first row in a color transformation matrix, T, for transforming the luminance of X-hat.

The function minimization problem given in Equation XXIII is solved by substituting the definition of X-hat$_i$ from Equation XV into Equation XXIII and taking the derivative with respect to $Y_{ik}$, which results in an iterative algorithm given by the following Equation XXIV:

$$Y_{ik}^{(n+1)} = Y_{ik}^{(n)} - \Theta \left\{ D_i F_{ik}^T H_i^T \left[ \begin{array}{c} (\hat{X}_i^{(n)} - X_i) + \\ \alpha^2 \nabla^2 \left( \begin{array}{c} T_{C_1 i} \sum_{j=1}^{N} T_{C_1 j} \hat{X}_j^{(n)} + \\ T_{C_2 i} \sum_{j=1}^{N} T_{C_2 j} \hat{X}_j^{(n)} \end{array} \right) \\ \beta^2 \nabla^2 T_{Li} \sum_{j=1}^{N} T_{Lj} \hat{X}_j^{(n)} \end{array} \right] \cdots + \right\} \quad \text{Equation XXIV}$$

where:
k=index for identifying individual sub-frames 110;
i and j=indices for identifying color planes;
n=index for identifying iterations;
$Y_{ik}^{(n+1)}$=kth low-resolution sub-frame 110 in the ith color plane for iteration number n+1;
$Y_{ik}^{(n)}$=kth low-resolution sub-frame 110 in the ith color plane for iteration number n;
Θ=momentum parameter indicating the fraction of error to be incorporated at each iteration;
$D_i$=down-sampling matrix for the ith color plane;
$H_i^T$=Transpose of interpolating filter, $H_i$, from Equation XIV (in the image domain, $H_i^T$ is a flipped version of $H_i$);
$F_{ik}^T$=Transpose of operator, $F_{ik}$, from Equation XV (in the image domain, $F_{ik}^T$ is the inverse of the warp denoted by $F_{ik}$);
X-hat$_i^{(n)}$=hypothetical or simulated high-resolution image for the ith color plane in the reference projector frame buffer, as defined in Equation XV, for iteration number n;
$X_i$=ith color plane of the desired high-resolution frame 408;
α and β=smoothing constants;
$\nabla^2$=Laplacian operator;

$T_{C1i}$=ith element in the second row in a color transformation matrix, T, for transforming the first chrominance channel of X-hat;

$T_{C2i}$=ith element in the third row in a color transformation matrix, T, for transforming the second chrominance channel of X-hat;

$T_{Li}$=ith element in the first row in a color transformation matrix, T, for transforming the luminance of X-hat;

X-hat$_j^{(n)}$=hypothetical or simulated high-resolution image for the jth color plane in the reference projector frame buffer, as defined in Equation XV, for iteration number n;

$T_{C1j}$=jth element in the second row in a color transformation matrix, T, for transforming the first chrominance channel of X-hat;

$T_{C2j}$=jth element in the third row in a color transformation matrix, T, for transforming the second chrominance channel of X-hat;

$T_{Lj}$=jth element in the first row in a color transformation matrix, T, for transforming the luminance of X-hat; and N=number of color planes.

Equation XXIV may be intuitively understood as an iterative process of computing an error in the hypothetical reference projector coordinate system and projecting it back onto the sub-frame data. In one embodiment, sub-frame generator 108 is configured to generate sub-frames 110 in real-time using Equation XXIV. The generated sub-frames 110 are optimal in one embodiment because they maximize the probability that the simulated high-resolution image 406 (X-hat) is the same as the desired high-resolution image 408 (X), and they minimize the error between the simulated high-resolution image 406 and the desired high-resolution image 408. Equation XXIV can be implemented very efficiently with conventional image processing operations (e.g., transformations, down-sampling, and filtering). The iterative algorithm given by Equation XXIV converges rapidly in a few iterations and is very efficient in terms of memory and computation (e.g., a single iteration uses two rows in memory; and multiple iterations may also be rolled into a single step). The iterative algorithm given by Equation XXIV is suitable for real-time implementation, and may be used to generate optimal sub-frames 110 at video rates, for example.

To begin the iterative algorithm defined in Equation XXIV, an initial guess, $Y_{ik}^{(0)}$, for the sub-frames 110 is determined. In one embodiment, the initial guess for the sub-frames 110 is determined by texture mapping the desired high-resolution frame 408 onto the sub-frames 110. In one embodiment, the initial guess is determined from the following Equation XXV:

$$Y_{ik}^{(0)} = D_i B_i F_{ik}^T X_i \qquad \text{Equation XXV}$$

where:
- k=index for identifying individual sub-frames 110;
- i=index for identifying color planes;
- $Y_{ik}^{(0)}$=initial guess at the sub-frame data for the kth sub-frame 110 for the ith color plane;
- $D_i$=down-sampling matrix for the ith color plane;
- $B_i$=interpolation filter for the ith color plane;
- $F_{ik}^T$=Transpose of operator, $F_{ik}$, from Equation II (in the image domain, $F_{ik}^T$ is the inverse of the warp denoted by $F_{ik}$); and
- $X_i$=ith color plane of the desired high-resolution frame 408.

Thus, as indicated by Equation XXV, the initial guess ($Y_{ik}^{(0)}$) is determined by performing a geometric transformation ($F_{ik}^T$) on the ith color plane of the desired high-resolution frame 408 ($X_i$), and filtering ($B_i$) and down-sampling ($D_i$) the result. The particular combination of neighboring pixels from the desired high-resolution frame 408 that are used in generating the initial guess ($Y_{ik}^{(0)}$) will depend on the selected filter kernel for the interpolation filter ($B_i$).

In another embodiment, the initial guess, $Y_{ik}^{(0)}$, for the sub-frames 110 is determined from the following Equation XXVI:

$$Y_{ik}^{(0)} = D_i F_{ik}^T X_i \qquad \text{Equation XXVI}$$

where:
- k=index for identifying individual sub-frames 110;
- i=index for identifying color planes;
- $Y_{ik}^{(0)}$=initial guess at the sub-frame data for the kth sub-frame 110 for the ith color plane;
- $D_i$=down-sampling matrix for the ith color plane;
- $F_{ik}^T$=Transpose of operator, $F_{ik}$, from Equation II (in the image domain, $F_{ik}^T$ is the inverse of the warp denoted by $F_{ik}$); and
- $X_i$=ith color plane of the desired high-resolution frame 408.

Equation XXVI is the same as Equation XXV, except that the interpolation filter ($B_k$) is not used.

Several techniques are available to determine the geometric mapping ($F_{ik}$) between each projector 112 and the hypothetical reference projector, including manually establishing the mappings, or using camera 40 and calibration unit 42 to automatically determine the mappings. In one embodiment, if camera 40 and calibration unit 42 are used, the geometric mappings between each projector 112 and the camera 40 are determined by calibration unit 42. These projector-to-camera mappings may be denoted by $T_k$, where k is an index for identifying projectors 112. Based on the projector-to-camera mappings ($T_k$), the geometric mappings ($F_k$) between each projector 112 and the hypothetical reference projector are determined by calibration unit 42, and provided to sub-frame generator 108. For example, in a display system 30 with two projectors 112A and 112B, assuming the first projector 112A is the hypothetical reference projector, the geometric mapping of the second projector 112B to the first (reference) projector 112A can be determined as shown in the following Equation XXVII:

$$F_2 = T_2 T_1^{-1} \qquad \text{Equation XXVII}$$

where:
- $F_2$=operator that maps a low-resolution sub-frame 110 of the second projector 112B to the first (reference) projector 112A;
- $T_1$=geometric mapping between the first projector 112A and the camera 40; and
- $T_2$=geometric mapping between the second projector 112B and the camera 40.

In one embodiment, the geometric mappings ($F_{ik}$) are determined once by calibration unit 42, and provided to sub-frame generator 108. In another embodiment, calibration unit 42 continually determines (e.g., once per frame 106) the geometric mappings ($F_{ik}$), and continually provides updated values for the mappings to sub-frame generator 108.

One embodiment provides an image display system 30 with multiple overlapped low-resolution projectors 112 coupled with an efficient real-time (e.g., video rates) image processing algorithm for generating sub-frames 110. In one embodiment, multiple low-resolution, low-cost projectors 112 are used to produce high resolution images at high lumen levels, but at lower cost than existing high-resolution projection systems, such as a single, high-resolution, high-output projector. One embodiment provides a scalable image display system 30 that can provide virtually any desired resolution, brightness, and color, by adding any desired number of component projectors 112 to the system 30.

In some existing display systems, multiple low-resolution images are displayed with temporal and sub-pixel spatial offsets to enhance resolution. There are some important differences between these existing systems and embodiments described herein. For example, in one embodiment, there is no need for circuitry to offset the projected sub-frames 110 temporally. In one embodiment, the sub-frames 110 from the component projectors 112 are projected "in-sync". As another example, unlike some existing systems where all of the sub-frames go through the same optics and the shifts between sub-frames are all simple translational shifts, in one embodiment, the sub-frames 110 are projected through the different optics of the multiple individual projectors 112. In one embodiment, the signal processing model that is used to generate optimal sub-frames 110 takes into account relative geometric distortion among the component sub-frames 110, and is robust to minor calibration errors and noise.

It can be difficult to accurately align projectors into a desired configuration. In one embodiment, regardless of what the particular projector configuration is, even if it is not an optimal alignment, sub-frame generator 108 determines and generates optimal sub-frames 110 for that particular configuration.

Algorithms that seek to enhance resolution by offsetting multiple projection elements have been previously proposed. These methods may assume simple shift offsets between projectors, use frequency domain analyses, and rely on heuristic methods to compute component sub-frames. In contrast, one form of the embodiments described herein utilize an optimal real-time sub-frame generation algorithm that explicitly accounts for arbitrary relative geometric distortion (not limited to homographies) between the component projectors 112, including distortions that occur due to a display surface that is non-planar or has surface non-uniformities. One embodiment generates sub-frames 110 based on a geometric relationship between a hypothetical high-resolution hypothetical reference projector at any arbitrary location and each of the actual low-resolution projectors 112, which may also be positioned at any arbitrary location.

In one embodiment, system 30 includes multiple overlapped low-resolution projectors 112, with each projector 112 projecting a different colorant to compose a full color high-resolution image on the display surface with minimal color artifacts due to the overlapped projection. By imposing a color-prior model via a Bayesian approach as is done in one embodiment, the generated solution for determining sub-frame values minimizes color aliasing artifacts and is robust to small modeling errors.

Using multiple off the shelf projectors 112 in system 30 allows for high resolution. However, if the projectors 112 include a color wheel, which is common in existing projectors, the system 30 may suffer from light loss, sequential color artifacts, poor color fidelity, reduced bit-depth, and a significant tradeoff in bit depth to add new colors. One embodiment described herein eliminates the need for a color wheel, and uses in its place, a different color filter for each projector 112. Thus, in one embodiment, projectors 112 each project different single-color images. By not using a color wheel, segment loss at the color wheel is eliminated, which could be up to a 30% loss in efficiency in single chip projectors. One embodiment increases perceived resolution, eliminates sequential color artifacts, improves color fidelity since no spatial or temporal dither is required, provides a high bit-depth per color, and allows for high-fidelity color.

Image display system 30 is also very efficient from a processing perspective since, in one embodiment, each projector 112 only processes one color plane. Thus, each projector 112 reads and renders only one-third (for RGB) of the full color data.

In one embodiment, image display system 30 is configured to project images that have a three-dimensional (3D) appearance. In 3D image display systems, two images, each with a different polarization, are simultaneously projected by two different projectors. One image corresponds to the left eye, and the other image corresponds to the right eye. Conventional 3D image display systems typically suffer from a lack of brightness. In contrast, with one embodiment, a first plurality of the projectors 112 may be used to produce any desired brightness for the first image (e.g., left eye image), and a second plurality of the projectors 112 may be used to produce any desired brightness for the second image (e.g., right eye image). In another embodiment, image display system 30 may be combined or used with other display systems or display techniques, such as tiled displays.

Although specific embodiments have been illustrated and described herein, it will be appreciated by those of ordinary skill in the art that a variety of alternate or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:

analyzing a first portion of image data to identify at least a first characteristic of the first portion of the image data; and determining at least a first algorithm based on at least the first characteristic, the first algorithm configured to generate at least first and second image data subsets with distortion using the image data such that the first and the second image data subsets are configured to cause a first image corresponding to the image data to be reproduced without the distortion in response to being simultaneously displayed with first and second projection devices, respectively.

2. The method of claim 1 further comprising:

categorizing the first portion of the image data using at least the first characteristic.

3. The method of claim 1 further comprising:

analyzing the first portion of the image data by determining a level of detail of the first portion.

4. The method of claim 1 further comprising:

analyzing the first portion of the image data by measuring a color contrast of the first portion.

5. The method of claim 1 wherein the first portion comprises one of a plurality of frames in the image data.

6. The method of claim 1 wherein the first portion comprises at least two frames in the image data.

7. The method of claim 1 further comprising:

analyzing a second portion of image data to identify at least a second characteristic of the second portion of the image data; and determining at least a second algorithm based on at least the second characteristic, the second algorithm configured to generate the first and second image data subsets with distortion using the image data such that the first and the second image data subsets are configured to cause a second image corresponding to the image data to be reproduced without the distortion in response to being simultaneously displayed with first and second projection devices, respectively.

8. The method of claim 7 wherein the first portion of the image data forms a first segment of a frame of the image data, and wherein the second portion of the image data forms a second segment of the frame of the image data.

9. The method of claim 1 further comprising:
generating the first and the second subsets using the first algorithm.

10. The method of claim 9 wherein the first algorithm includes at least one of a bit-plane splitting algorithm, a color channel splitting algorithm, and a random factor splitting algorithm.

11. A system comprising:
an image analysis system configured to analyze a first portion of image data to identify at least a first characteristic of the first portion of the image data and determine at least a first algorithm based on at least the first characteristic; and
a subset generating unit configured to generate at least first and second image data subsets with distortion using the image data and the first algorithm such that the first and the second image data subsets are configured to cause a first image corresponding to the image data to be reproduced without the distortion in response to being simultaneously displayed with first and second projection devices, respectively.

12. The system of claim 11 wherein the image analysis system is configured to categorize the first portion of the image data using at least the first characteristic.

13. The system of claim 11 wherein the image analysis system is configured to analyze the first portion of the image data by determining a level of detail of the first portion.

14. The system of claim 11 wherein the image analysis system is configured to analyze the first portion of the image data by measuring a color contrast of the first portion.

15. The system of claim 11 wherein the first portion comprises one of a plurality of frames in the image data.

16. The system of claim 11 wherein the first portion comprises at least two frames in the image data.

17. The system of claim 11 wherein the image analysis system is configured to analyze a second portion of image data to identify at least a second characteristic of the second portion of the image data and determine at least a second algorithm based on at least the second characteristic, and wherein the subset generating unit is configured to generate the first and second image data subsets with distortion using the image data and the second algorithm such that the first and the second image data subsets are configured to cause a second image corresponding to the image data to be reproduced without the distortion in response to being simultaneously displayed with first and second projection devices, respectively.

18. The system of claim 11 wherein the first portion of the image data forms a first segment of a frame of the image data, and wherein the second portion of the image data forms a second segment of the frame of the image data.

19. The system of claim 11 wherein the first algorithm includes at least one of a bit-plane splitting algorithm, a color channel splitting algorithm, and a random factor splitting algorithm.

20. A computer-readable medium having computer-executable instructions for performing a method comprising:
analyzing a portion of image data to identify at least a characteristic of the portion; and
determining an algorithm based on at least the characteristic, the algorithm configured to generate at least first and second image data subsets with distortion using the image data such that the first and the second image data subsets are configured to cause an image corresponding to the image data to be reproduced without the distortion in response to being simultaneously displayed with first and second projection devices, respectively.

* * * * *

UNITED STATES PATENT AND TRADEMARK OFFICE
CERTIFICATE OF CORRECTION

PATENT NO. : 7,559,661 B2
APPLICATION NO. : 11/297922
DATED : July 14, 2009
INVENTOR(S) : Simon Widdowson et al.

It is certified that error appears in the above-identified patent and that said Letters Patent is hereby corrected as shown below:

In column 11, line 5, delete "top" and insert -- to p --, therefor.

In column 11, line 17, delete "10(q)" and insert -- 110(q) --, therefor.

In column 11, line 17, delete "100(q)" and insert -- 110(q) --, therefor.

In column 12, line 37, delete "10C" and insert -- 110C --, therefor.

In column 12, line 52, delete "10B," and insert -- 110B, --, therefor.

In column 12, line 57, delete "10B," and insert -- 110B, --, therefor.

In column 13, line 63, delete "3003B-2" and insert -- 300B-2 --, therefor.

In column 17, line 7, delete "Equation W" and insert -- Equation V --, therefor.

In column 17, line 35, delete "1×" and insert -- 1X --, therefor.

In column 18, line 3, delete "308(A)" and insert -- 308 (X) --, therefor.

In column 23, line 60, delete " $\beta^2 \left\| \nabla \left( \sum_{i=1}^{N} T_{Li} \hat{X}_i \right) \right\|^2$ " and insert -- $\beta^2 \left\| \nabla \left( \sum_{i=1}^{N} T_{Li} \hat{X}_i \right) \right\|^2$ --, therefor.

In column 24, line 13, delete "$T_{Cli}$" and insert -- $T_{C1i}$ --, therefor.

In column 30, line 16, in Claim 18, delete "claim 11" and insert -- claim 17 --, therefor.

Signed and Sealed this

Tenth Day of August, 2010

David J. Kappos
*Director of the United States Patent and Trademark Office*